(12) United States Patent
Seo et al.

(10) Patent No.: US 10,924,317 B2
(45) Date of Patent: Feb. 16, 2021

(54) METHOD FOR TRANSMITTING OR RECEIVING DOWNLINK CONTROL INFORMATION IN WIRELESS COMMUNICATION SYSTEM, AND DEVICE THEREFOR

(71) Applicant: LG Electronics Inc., Seoul (KR)

(72) Inventors: Inkwon Seo, Seoul (KR); Yunjung Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 10 days.

(21) Appl. No.: 16/347,516

(22) PCT Filed: Nov. 2, 2017

(86) PCT No.: PCT/KR2017/012336
§ 371 (c)(1),
(2) Date: May 3, 2019

(87) PCT Pub. No.: WO2018/084604
PCT Pub. Date: May 11, 2018

(65) Prior Publication Data
US 2019/0268208 A1    Aug. 29, 2019

Related U.S. Application Data

(60) Provisional application No. 62/454,036, filed on Feb. 2, 2017, provisional application No. 62/447,455, filed (Continued)

(51) Int. Cl.
*H04L 27/26* (2006.01)
*H04L 25/02* (2006.01)
(Continued)

(52) U.S. Cl.
CPC ............ *H04L 27/2676* (2013.01); *H04L 5/00* (2013.01); *H04L 25/0238* (2013.01);
(Continued)

(58) Field of Classification Search
CPC ..... H04L 5/001; H04L 5/0048; H04L 5/0053; H04L 27/26; H04L 27/2602;
(Continued)

(56) References Cited

U.S. PATENT DOCUMENTS

2011/0110316 A1    5/2011  Chen et al.
2014/0247816 A1*   9/2014  Kim ................ H04W 72/0446
                                                         370/336
(Continued)

FOREIGN PATENT DOCUMENTS

WO    20130055193    4/2013

OTHER PUBLICATIONS

Intel Corporation, "Overall DCI design options for higher data rates for FeMTC," R1-1609476, 3GPP TSG RAN WG1 Meeting #86bis, Lisbon, Portugal, Oct. 10-14, 2016, 5 pages.

(Continued)

*Primary Examiner* — Gary Mui
(74) *Attorney, Agent, or Firm* — Fish & Richardson P.C.

(57) ABSTRACT

A method by which a terminal receives downlink control information in a wireless communication system includes: receiving a reference signal for a control channel by a search space set in a control resource set; and receiving downlink control information of the control channel on the basis of the reference signal. The search space includes a plurality of control channel candidates respectively corresponding to one or at least two CCEs according to an aggregation level, the one or at least two CCEs respectively include a plurality of REGs, and the terminal performs blind detection for each of the plurality of control channel candidates, and it can be assumed that a reference signal for a predetermined control channel candidate, for which blind detection is currently (Continued)

being performed, is mapped to a first REG firstly located in a time domain among REGs included in the predetermined control channel candidate.

15 Claims, 18 Drawing Sheets

Related U.S. Application Data on Jan. 18, 2017, provisional application No. 62/417,313, filed on Nov. 3, 2016.

(51) Int. Cl.
*H04W 72/04* (2009.01)
*H04L 5/00* (2006.01)

(52) U.S. Cl.
CPC .......... *H04L 27/26* (2013.01); *H04L 27/2657* (2013.01); *H04W 72/0406* (2013.01)

(58) Field of Classification Search
CPC ............. H04L 27/2657; H04L 27/2676; H04L 25/0238; H04W 72/0406
See application file for complete search history.

(56) References Cited

U.S. PATENT DOCUMENTS

| | | |
|---|---|---|
| 2015/0029984 A1 | 1/2015 | Wang |
| 2019/0037540 A1* | 1/2019 | Seo ........................ H04B 7/0617 |
| 2019/0158170 A1* | 5/2019 | Seo ........................... H04J 11/00 |
| 2019/0174567 A1* | 6/2019 | Kusashima ........... H04W 76/15 |
| 2019/0306840 A1* | 10/2019 | Taherzadeh Boroujeni ................ H04L 5/0053 |
| 2019/0306847 A1* | 10/2019 | Seo ...................... H04W 72/042 |
| 2020/0067675 A1* | 2/2020 | Takeda ................ H04W 72/042 |

OTHER PUBLICATIONS

Nokia, Alcatel-Lucent Shanghai Bell, "On design of search space for short PDCCH," R1-1609324, 3GPP TSG-RAN WG1 Meeting #86bis, Lisbon, Portugal, Oct. 10-14, 2016, 6 pages.

PCT International Search Report and Written Opinion in International Application No. PCT/KR2017/012336, dated Jan. 26, 2018, 18 pages (with English translation).

* cited by examiner

METHOD FOR TRANSMITTING OR RECEIVING DOWNLINK CONTROL INFORMATION IN WIRELESS COMMUNICATION SYSTEM, AND DEVICE THEREFOR

CROSS-REFERENCE TO RELATED APPLICATIONS

This application is a National Stage application under 35 U.S.C. § 371 of International Application No. PCT/KR2017/012336, filed on Nov. 2, 2017, which claims the benefit of U.S. Provisional Application No. 62/454,036, filed on Feb. 2, 2017, U.S. Provisional Application No. 62/447,455, filed on Jan. 18, 2017, and U.S. Provisional Application No. 62/417,313, filed on Nov. 3, 2016. The disclosures of the prior applications are incorporated by reference in their entirety.

TECHNICAL FIELD

The present invention relates to a wireless communication system, and more particularly, to a method for transmitting and receiving downlink control information based on a blind detection technique, and a device therefor.

BACKGROUND ART

As more communication devices require greater communication capacity, the need of mobile broadband communication more enhanced than the conventional RAT (radio access technology) has been issued in a next generation communication system discussed recently. Also, massive MTC (Machine Type Communications) technology that provides various services anywhere and at any time by connecting a plurality of devices and things is one of main issues which will be considered in next generation communication. Furthermore, considering service/user equipment (UE) susceptible to latency and reliability, Ultra-Reliable and Low Latency Communication (URLLC) has been discussed in a next generation communication system.

As described above, a new RAT considering eMBB, mMTC and URLCC has been discussed for next generation wireless communication.

DISCLOSURE

Technical Problem

An object of the present invention devised to solve the problem lies on a method and apparatus for efficiently transmitting or receiving downlink control information in a wireless communication system.

The technical objects of the present invention are not limited to the aforementioned objects, and other technical objects not described herein will be understood from the embodiments of the present invention.

Technical Solution

The object of the present invention can be achieved by providing a method for receive downlink control information by a user equipment (UE) in a wireless communication system, the method including receiving a reference signal for a control channel in search spaces configured in a control resource set (CORESET), and receiving downlink control information on the control channel based on the reference signal, wherein the search space includes a plurality of control channel candidates each corresponding to one or more control channel elements (CCEs) according to an aggregation level, each of the one or more CCEs including a plurality of resource element groups (REGs), and wherein the UE performs blind detection on each of the plurality of control channel candidates, assuming that a reference signal for a predetermined control channel candidate currently subjected to blind detection is mapped to a first REG arranged at a leading position in a time domain among REGs included in the predetermined control channel candidate.

In another aspect of the present invention, provided herein is a user equipment (UE) for receiving downlink control information, including a processor, and a receiver operative under control of the processor to receive a reference signal for a control channel in a search space configured in a control resource set (CORESET), and to receive downlink control information on the control channel based on the reference signal, wherein the search space includes a plurality of control channel candidates each corresponding to one or more control channel elements (CCEs) according to an aggregation level, each of the one or more CCEs including a plurality of resource element groups (REGs), and wherein the processor performs blind detection on each of the plurality of control channel candidates, assuming that a reference signal for a predetermined control channel candidate currently subjected to blind detection is mapped to a first REG arranged at a leading position in a time domain among REGs included in the predetermined control channel candidate.

In another aspect of the present invention, provided herein is a method for transmitting downlink control information by a base station in a wireless communication system, the method including mapping a reference signal for a control channel in search spaces configured in a control resource set (CORESET), and transmitting, to a user equipment (UE), the reference signal and downlink control information present on the control channel, wherein each of the search spaces includes a plurality of control channel candidates each corresponding to one or more control channel elements (CCEs) according to an aggregation level, each of the one or more CCEs including a plurality of resource element groups (REGs), and wherein the base station maps a reference signal for a predetermined control channel candidate carrying the downlink control information among the plurality of control channel candidates to a first REG arranged at a leading position in a time domain among REGs included in a predetermined control channel candidate.

In another aspect of the present invention, provided herein is a base station apparatus for transmitting the downlink control information described above.

When a second REG among the REGs included in the predetermined control channel candidate belongs to the same physical resource block (PRB) as the first REG in a frequency domain and is positioned after the first REG in the time domain, the UE may perform blind detection on a predetermined control channel candidate by applying a channel estimation result obtained through a reference signal on the first REG to the second REG.

When the first REG belongs to a first CCE and one or more REGs of a second CCE different from the first CCE are positioned on the same physical resource block (PRB) as the first REG, the UE may assume that the reference signal is also mapped to a second REG arranged at a leading position between the one or more REGs of the second CCE in the time domain.

Both a common search space (CSS) and a UE-specific search space (USS) may be configured in the CORESET, wherein reference signal transmission may be configured for the USS separately from the CSS. As one example, the CSS and the USS may be distinguished from each other through different resources in the CORESET. As another example, reference signal transmission for the CSS may be performed on a resource in the CORESET, the CSS and the USS overlapping with each other on the resource.

The UE may reuse at least a part of a channel estimation result obtained from the reference signal for the predetermined control channel candidate for blind detection of another control channel candidate to be performed after a current time.

The UE may obtain a reference signal map for each search space by arranging all positions of reference signal resources determined for each of the control channel candidates in an overlapping manner, wherein the UE may perform rate matching of the predetermined control channel candidate on an assumption of reference signal transmission on a specific reference signal resource identified through the reference signal map, regardless of whether or not the specific reference signal resource corresponds to an aggregate level of current blind detection.

The at least reused part of the channel estimation result may be obtained from a CCE included in the predetermined control channel candidate and the other control channel candidate in common.

Advantageous Effects

According to an embodiment of the present invention, when CCEs for control channel transmission each include multiple REGs, a reference signal to be used for blind detection of a control channel may fixedly mapped to a REG preceding the other REGs among the multiple REGs in the time domain. Thereby, ambiguity of reference signal mapping may be addressed, and overhead of reference signal transmission may be reduced.

The technical effects of the present invention are not limited to those described above, and other technical effects may be derived from the embodiments of the present invention.

DESCRIPTION of DRAWINGS

The accompanying drawings, which are included to provide a further understanding of the invention and are incorporated in and constitute a part of this application, illustrate embodiments of the invention and, together with the description, serve to explain the principles of the invention. The accompanying drawings, which are included to provide a further understanding of the invention and are incorporated in and constitute a part of this application, illustrate embodiments of the invention and, together with the description, serve to explain the principles of the invention.

BEST MODE

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. 3GPP LTE adopts OFDMA in downlink and adopts SC-FDMA in uplink. LTE-A (LTE-Advanced) is an evolved version of 3GPP LTE.

For clarity, the following description mainly concerns 3GPP based mobile communication system, but the technical idea of the present invention is not limited thereto. Specific terms used in the following description are provided to provide further understanding of the present invention and use of the terms may be modified to other forms within the scope of the present invention.

Prior to discussion of the New RAT, the 3GPP LTE/LTE-A system will briefly be described. The following description of 3GPP LTE/LTE-A may be referenced to help understanding of New RAT, and some LTE/LTE-A operations and configurations that do not conflict with the design of New RAT may also be applied to New RAT. New RAT may be referred to as 5G mobile communication for convenience.

3GPP LTE/LTE-A System

Figure 1:
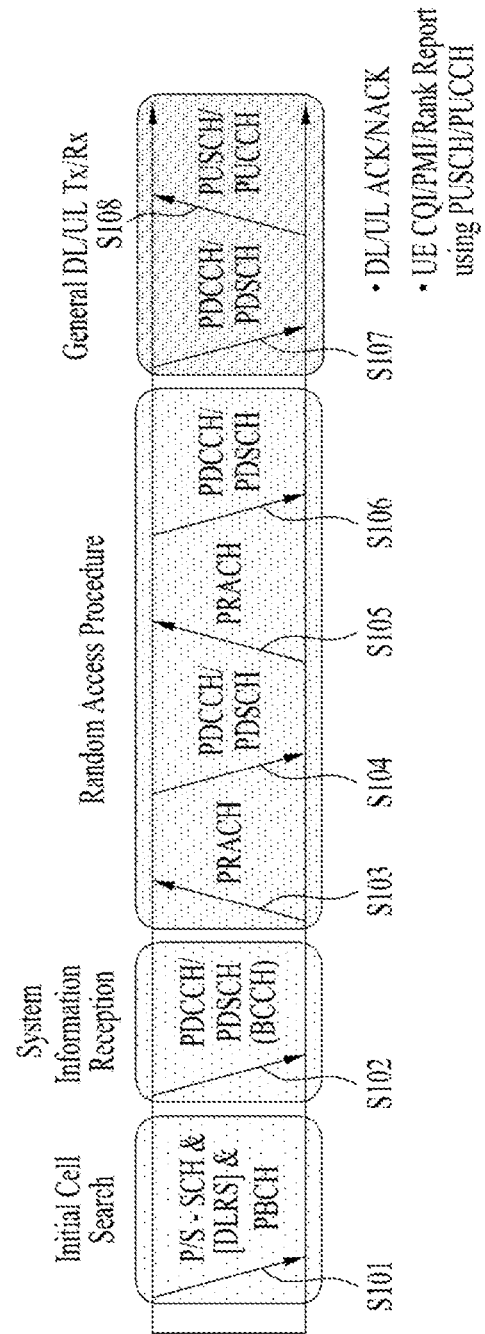
FIG. 1 is a diagram illustrating physical channels used for 3GPP LTE/LTE-A system and a general signal transmission method using the same.

FIG. 1 is a diagram illustrating physical channels used for 3GPP LTE/LTE-A system and a general signal transmission method using the same.

Referring to FIG. 1, if power of a user equipment (UE) is turned on or the UE enters a new cell, the UE may perform an initial cell search operation for matching synchronization with a base station (BS) and the like in operation S101. To this end, the UE may receive a primary synchronization channel (P-SCH) and a secondary synchronization channel (S-SCH) from the BS, may match synchronization with the BS and may then obtain information such as a cell ID and the like. Subsequently, the UE may receive a physical broadcast channel (PBCH) from the BS and may be then able to obtain intra-cell broadcast information. Meanwhile, the UE may receive a downlink reference signal (DL RS) and may be then able to check a DL channel state.

Upon completing the initial cell search, the UE may receive a physical downlink control channel (PDCCH) and a physical downlink shared control channel (PDSCH) according to the physical downlink control channel (PDCCH) in operation S102, thereby obtaining a detailed system information.

Thereafter, the UE may perform a random access procedure to complete access to the BS as in operations S103 to S106. To this end, the UE may transmit a preamble via a physical random access channel (PRACH) (S103) and may then receive a response message on PDCCH and a corresponding PDSCH in response to the preamble (S104). In case of contention-based random access, it may perform a contention resolution procedure such as a transmission (S105) of an additional physical random access channel and a channel reception (S106) of a physical downlink control channel and a corresponding physical downlink shared channel.

Upon performing the above-mentioned procedures, the UE may perform a PDCCH/PDSCH reception (S107) and a PUSCH/PUCCH (physical uplink shared channel/physical uplink control channel) transmission (S108) as a general uplink/downlink signal transmission procedure. Control information transmitted to a BS by a UE may be commonly named uplink control information (hereinafter abbreviated UCI). The UCI may include Hybrid Automatic Repeat and reQuest Acknowledgement/Negative-ACK (HARQ-ACK/NACK), Scheduling Request (SR), Channel Quality Indication (CQI), Precoding Matrix Indication (PMI), Rank Indication (RI) and the like. In the present specification, the HARQ-ACK/NACK is simply called HARQ-ACK or ACK (NACK) (A/N). The HARQ-ACK includes at least one of a positive ACK (simply, ACK), a negative ACK (NACK), DTX, and NACK/DTX. The UCI is normally transmitted on PUCCH. Yet, when both control information and traffic data need to be simultaneously transmitted, the UCI may be transmitted on PUSCH. Moreover, the UCI may be non-periodically transmitted in response to a request/indication made by a network.

Figure 2:
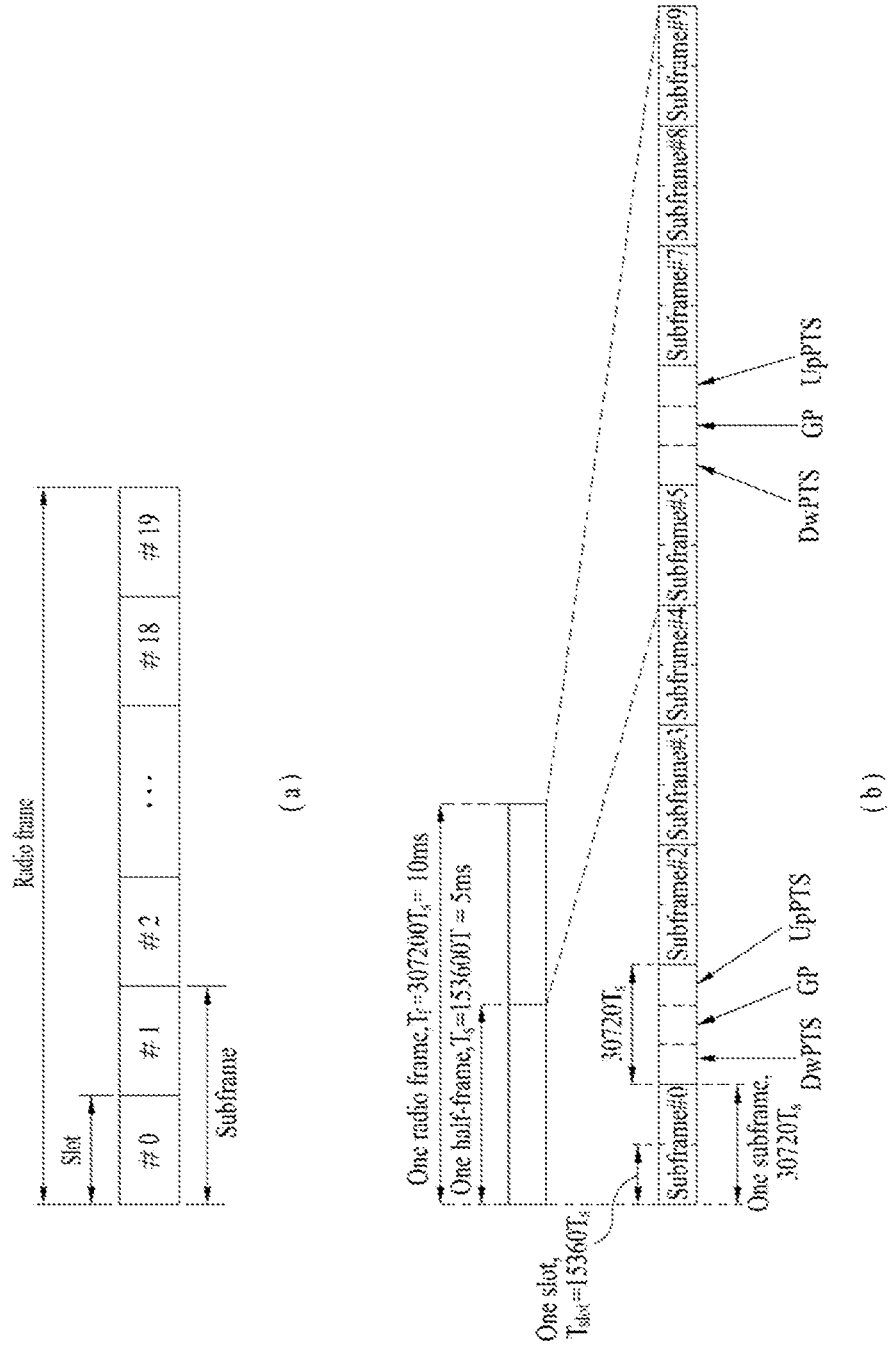
FIG. 2 is a diagram illustrating a structure of a radio frame for 3GPP LTE/LTE-A system.

FIG. 2 is a diagram illustrating a structure of a radio frame. Referring to FIG. 2, UL/DL (uplink/downlink) data packet transmission is performed in a unit of subframe in a cellular OFDM radio packet communication system. And, one subframe is defined as a predetermined time interval including a plurality of OFDM symbols. In the 3GPP LTE standard, a type-1 radio frame structure applicable to FDD (frequency division duplex) and a type-2 radio frame structure applicable to TDD (time division duplex) are supported.

FIG. 2(a) is a diagram for a structure of a type 1 radio frame. A DL (downlink) radio frame includes 10 subframes. Each of the subframes includes 2 slots in time domain. And, a time taken to transmit one subframe is defined as a transmission time interval (hereinafter abbreviated TTI). For instance, one subframe may have a length of 1 ms and one slot may have a length of 0.5 ms. One slot may include a plurality of OFDM symbols in time domain and may include a plurality of resource blocks (RBs) in frequency domain. Since 3GPP LTE system uses OFDM in downlink, OFDM symbol is provided to indicate one symbol period. The OFDM symbol may be named SC-FDMA symbol or symbol period. Resource block (RB) may include a plurality of contiguous subcarriers in one slot.

The number of OFDM symbols included in one slot may vary according to a configuration of Cyclic Prefix (CP). The CP may be categorized into an extended CP and a normal CP. For instance, in case that OFDM symbols are configured by the normal CP, the number of OFDM symbols included in one slot may be 7. In case that OFDM symbols are configured by the extended CP, since a length of one OFDM symbol increases, the number of OFDM symbols included in one slot may be smaller than that of the case of the normal CP. In case of the extended CP, for instance, the number of OFDM symbols included in one slot may be 6. If a channel status is unstable (e.g., a UE is moving at high speed), it may use the extended CP to further reduce the inter-symbol interference.

When a normal CP is used, since one slot includes 7 OFDM symbols, one subframe includes 14 OFDM symbols. In this case, first maximum 3 OFDM symbols of each subframe may be allocated to PDCCH (physical downlink control channel), while the rest of the OFDM symbols are allocated to PDSCH (physical downlink shared channel).

FIG. 2(b) is a diagram for an example of a structure of a type 2 radio frame. The type-2 radio frame includes 2 half frames. Each of the half frames includes 5 subframes, DwPTS (downlink pilot time slot), GP (guard period) and UpPTS (uplink pilot time slot) and one subframe consists of two slots. The DwPTS is used for initial cell search, synchronization or channel estimation in a UE. The UpPTS is used for channel estimation in a BS and uplink transmission synchronization of a UE. The guard period is a period for eliminating interference generated in uplink due to multi-path delay of a downlink signal between uplink and downlink.

The above-described structures of the radio frame are exemplary only. And, the number of subframes included in a radio frame, the number of slots included in the subframe and the number of symbols included in the slot may be modified in various ways.

Figure 3:
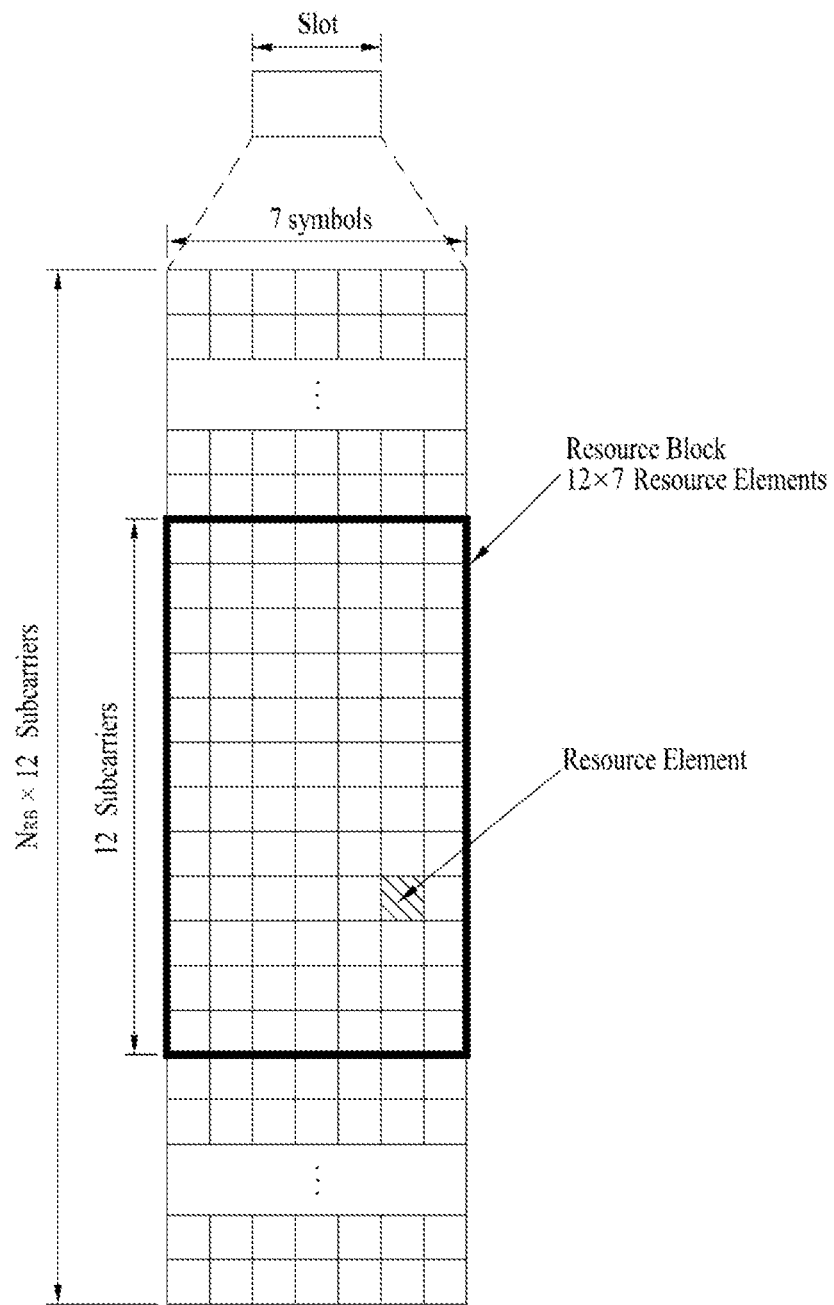
FIG. 3 is a diagram illustrating a resource grid for a downlink slot for 3GPP LTE/LTE-A system.

FIG. 3 is a diagram illustrating a resource grid for a downlink slot.

Referring to FIG. 3, one downlink (DL) slot may include a plurality of OFDM symbols in time domain. In particular, one DL slot exemplarily includes 7(6) OFDM symbols and one resource block (RB) includes 12 subcarriers in frequency domain. Each element on a resource grid is called a resource element (hereinafter abbreviated RE). One resource block includes 12 7(6) resource elements. The number NRB of resource blocks included in a DL slot may depend on a DL transmission bandwidth. And, the structure of an uplink (UL) slot may be identical to that of the DL slot and OFDM symbol is replaced by SC-FDMA symbol.

Figure 4:
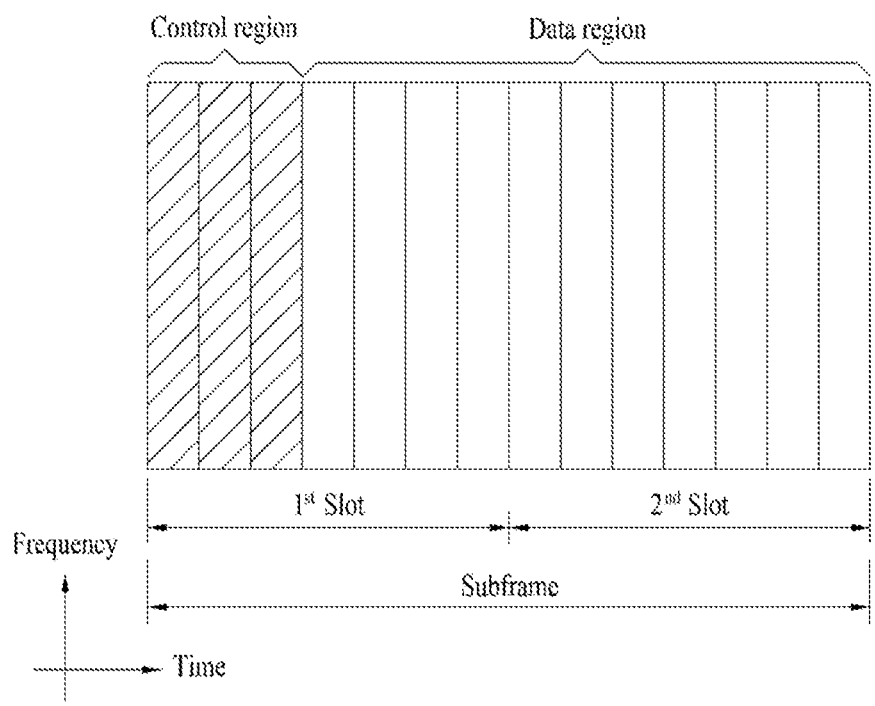
FIG. 4 is a diagram illustrating a structure of a downlink subframe for 3GPP LTE/LTE-A system.

FIG. 4 is a diagram illustrating a structure of a downlink subframe.

Referring to FIG. 4, maximum 3(4) OFDM symbols situated at a fore part of a first slot of one subframe correspond to a control region to which control channels are allocated. The rest of OFDM symbols correspond to a data region to which PDSCH (physical downlink shared channel) is allocated. PDSCH is used for carrying a transport block (hereinafter abbreviated TB) or a codeword (hereinafter abbreviated CW) corresponding to the TB. The TB means a data block delivered from a MAC (medium access control) layer to a PHY (physical) layer on a transport channel. The CW corresponds to a coded version of the TB. Correlation between the TB and the CW may vary depending on a swapping. In the present specification, PDSCH, a TB, and a CW are used in a manner of being mixed. Examples of DL control channels used by LTE (-A) may include PCFICH (Physical Control Format Indicator Channel), PDCCH (Physical Downlink Control Channel), PHICH (Physical hybrid automatic repeat request indicator Channel) and the like. The PCFICH is transmitted in a first OFDM symbol of a subframe and carries information on the number of OFDM symbols used for a transmission of a control channel within the subframe. The PHICH carries a HARQ-ACK (hybrid automatic repeat and request acknowledgement) signal in response to an UL transmission. The HARQ-ACK response includes a positive ACK (simply, ACK), a negative ACK (NACK), DTX (discontinuous transmission), or NACK/DTX. In this case, HARQ-ACK, HARQ ACK/NACK, and ACK/NACK are used in a manner of being mixed.

Control information carried on PDCCH may be called downlink control information (hereinafter abbreviated DCI). The DCI includes resource allocation information for a UE or a UE group and different control information. For instance, the DCI includes UL/DL scheduling information, UL transmit (Tx) power control command, and the like.

Figure 5:
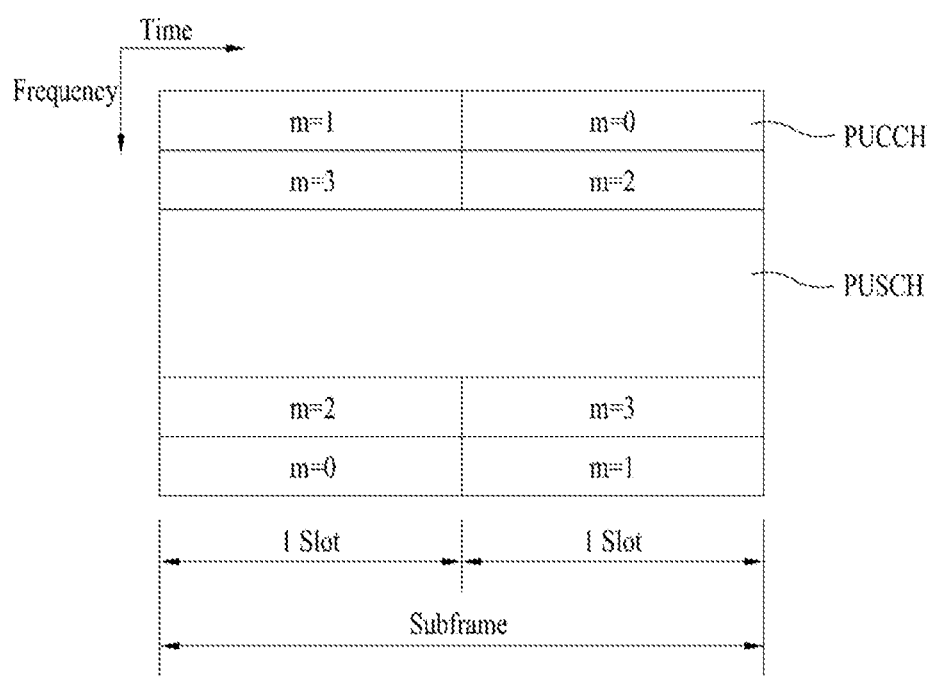
FIG. 5 is a diagram illustrating a structure of an uplink subframe for 3GPP LTE/LTE-A system.

FIG. 5 is a diagram illustrating a structure of an uplink subframe.

Referring to FIG. 5, an uplink subframe includes a plurality of slots (e.g., 2 slots). A slot may include a different number of SC-FDMA symbols according to a length of CP. A UL subframe may be divided into a control region and a data region in frequency domain. The data region includes PUSCH and can be used for transmitting a data signal such as an audio and the like. The control region includes PUCCH and can be used for transmitting UL control information (UCI). The PUCCH includes an RB pair situated at the both ends of the data region on a frequency axis and hops on a slot boundary.

The PUCCH can be used for transmitting control information such as SR (Scheduling Request), HARQ-ACK and/or CSI (Channel State Information).

New RAT

According to performance requirements for the new RAT, a subframe needs to be newly designed to satisfy low latency. The 3GPP LTE system has been designed in a frame structure having TTI of 1 ms, and a data request latency time for a video application is 10 ms. However, future 5G technology requires data transmission of lower latency due to the introduction of a new application such as real-time control and tactile internet, and aims to provide data latency reduced by 10 times as compared with the related art.

Self-Contained Subframe

Figure 6:
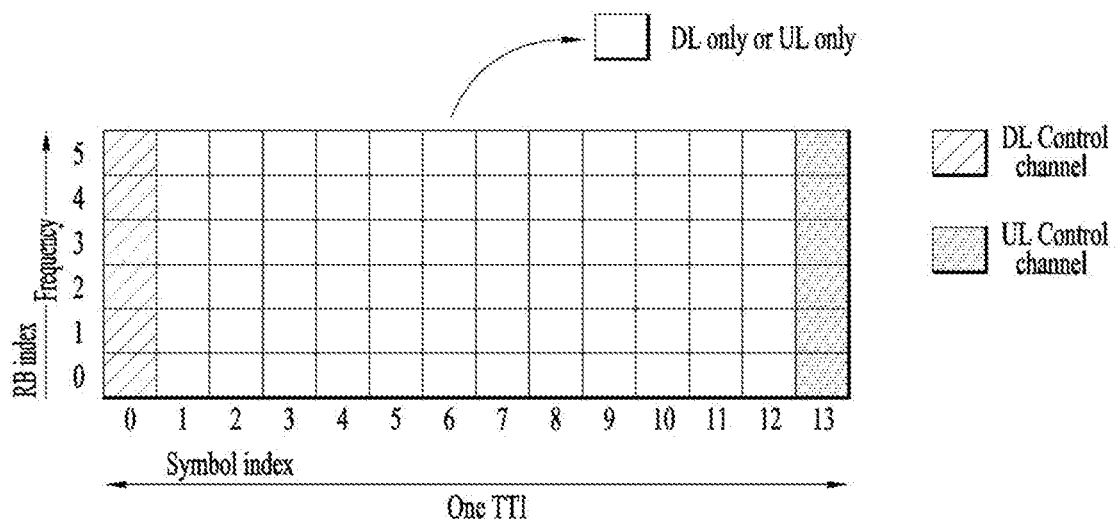
FIG. 6 is a diagram illustrating a structure of a self-contained subframe according to one embodiment of the present invention.

FIG. 6 is a diagram illustrating a structure of a self-contained subframe according to one embodiment of the present invention.

According to a TDD-based self-contained subframe structure, both a resource region for DL and a resource region for UL (e.g., DL and UL control channels) exist in one subframe.

In FIG. 6, hatched areas indicate downlink control regions and black colored areas indicate uplink control regions. Areas having no mark may be used for downlink data transmission or uplink data transmission.

In this self-contained subframe structure, downlink (DL) transmission and uplink (UL) transmission are performed in due order within one subframe, whereby DL data may be transmitted and UL ACK/NACK may be received within one subframe. Similarly, UL data may be transmitted and DL ACK/NACK may be received within one subframe. As a result, the time required for data re-transmission may be reduced when an error occurs in data transmission, whereby latency of final data transfer may be minimized.

As described above, the expression "Self-Contained" may cover that a response (ACK/NACK) to DL or UL transmitted within the corresponding subframe is received within the corresponding subframe. However, since the time of one subframe or more may be required for transmission and response according to processing performance of the UE/eNB, the self-contained subframe will be defined as a subframe that may self-contain DL control information, DL/UL data and UL control information. That is, UL control information of Self-contained Subframe is not limited to HARQ-ACK information on DL data transmitted at the corresponding subframe.

This self-contained subframe structure requires a time gap that allows a BS and a UE to switch a transmission mode to a reception mode and vice versa. To this end, at least one OFDM symbol on which DL to UL switching is performed is set as a guard period (GP) in the self-contained subframe structure.

Although the self-contained subframe structure shown in FIG. 6 shows that a subframe is configured in the order of DL control region-data region-UL control region, the present invention is not limited thereto. For example, as another self-contained subframe structure, a subframe may be configured in the order of DL control region-UL control region-data region.

Also, for convenience of description, one subframe includes a total of 14 OFDM symbols, and one OFDM symbol is allocated to each of the DL control region and the UL control region. However, one or more OFDM symbols may be allocated to each of the DL control region and the UL control region. Similarly, the number of OFDM symbols included in one subframe may be changed.

Figure 7:
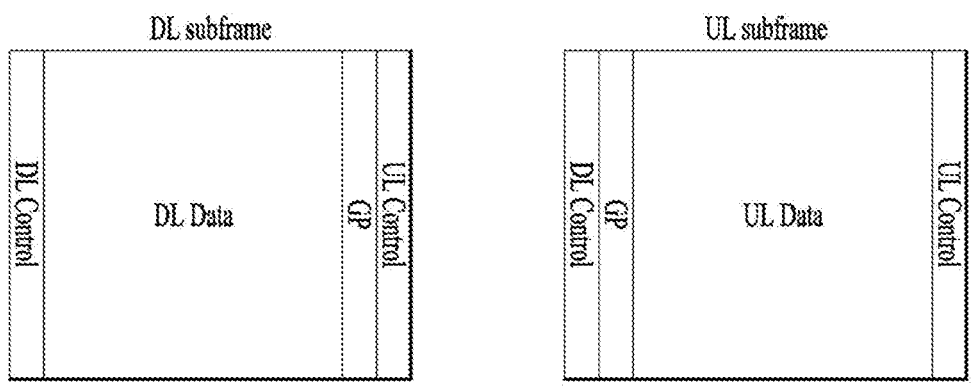
FIG. 7 is a diagram illustrating a downlink self-contained subframe and an uplink self-contained subframe according to one embodiment of the present invention.

FIG. 7 is a diagram illustrating a DL subframe and a UL subframe according to one embodiment of the present invention.

Referring to FIG. 7, the GP is located at the time when DL is switched to UL. For example, the GP is located between the DL data region and the UL control region at the DL subframe and is located between the DL control region and the UL data region at the UL subframe.

The GP may include Tx/Rx switching time of the eNB/UE and a timing advance (TA) for UL transmission of the UE.

Analog Beamforming

Since a wavelength becomes short in the field of Millimeter Wave (mmW), a plurality of antenna elements may be installed in the same area. That is, a wavelength is 1 cm in a band of 30 GHz, and a total of 100 antenna elements of a 2D array may be arranged in a panel of 5 by 5 cm at an interval of 0.5λ (wavelength). Therefore, as a plurality of antenna elements are used, beamforming gain is enhanced, and coverage increase and/or throughput improvement is expected.

In the mmW scheme, if a transceiver unit (TXRU) is provided per antenna element, it is possible to control a transmission power and phase per antenna element, whereby independent beamforming may be performed for each frequency resource. However, a problem occurs in that effectiveness is deteriorated in view of cost when TXRU is independently provided for all of 100 antenna elements.

Therefore, a scheme for mapping a plurality of antenna elements into one TXRU and controlling a beam direction by an analog phase shifter may be considered. However, since this analog beamforming scheme forms beams in only one beam direction with respect to a full band, a problem occurs in that frequency selective beamforming is not available.

As a hybrid type of digital beamforming and analog beamforming, a hybrid beamforming scheme for mapping a total of B TXRUs into a total of Q antenna elements (where, B<Q) may be considered. In this case, although there is a difference depending on a mutual connection scheme of B TXRUs and Q antenna elements, the number of beam directions that enable simultaneous transmission is limited to B or less.

Reference Signal Configuration for New RAT

Hereinafter, reference signal (RS) configuration schemes for control channel demodulation in the NR system will be described.

In the NR system, a unit forming the basis of transmission of a control channel may be defined as a NR-resource element group (REG) and/or a NR-control channel element (CCE).

While it is assumed in the following description that a control channel is configured with an NR-REG and an NR-CCE for simplicity, a control channel may be configured using only one unit (e.g., NR-CCE). For example, unlike the embodiments described below, the control channel may be configured using only NR-CCEs without NR-REGs. In this case, the NR-REG described in the corresponding embodiment may refer to a constituent (e.g., PRB, OFDM symbol set, etc.) of an NR-CCE. For example, when an NR-CCE is configured on one OFDM symbol and four PRBs, the NR-REG in the corresponding embodiment may correspond to each PRB. As such, the NR-REG may be interpreted as a generic term referring to a smaller unit that constitutes an NR-CCE. The NR-REG/NR-CCE may be referred to simply as an REG/CCE.

An NR-REG may correspond to one OFDM symbol in the time domain and X PRB(s) in the frequency domain. For example, X=1, and 1 PRB may correspond to 12 subcarriers. From the perspective of the UE, when an RS is transmitted within an NR-REG, a control channel may be rate-matched with respect to an RE on which the RS is transmitted.

For example, one REG may correspond to one PRB in the frequency domain and one symbol in the time domain. In addition, 1 CCE may correspond to 6 REGs.

A control resource set (CORESET) and a search space (SS) will be briefly reviewed. A CORESET is a set of resources for control signal transmission, and an SS is a set of control channel candidates on which a UE performs blind detection. The SS may be configured in the CORESET. For example, when one SS is defined in one CORESET, a CORESET for the common search space (CSS) and a CORESET for the UE-specific search space (USS) may be configured. As another example, multiple SSs may be defined in one CORESET. For example, a CSS and a USS may be configured in the same CORESET. In the following examples, a CSS may refer to a CORESET in which the CSS is configured, and a USS may refer to a CORESET in which the USS is configured.

A BS may signal information about the CORESET to a UE. As an example, for each CORESET, a CORESET configuration and a time duration (e.g., 1/2/3 symbols) of the CORESET may be signaled. When interleaving for distributing the CCE over a 1-symbol CORESET is applied, bundling of two or six REGs may be performed. In a 2-symbol CORESET, bundling of 2 or 6 REGs may be performed and time first mapping may be applied. In a 3-symbol CORESET, bundling of 3 or 6 REGs may performed and time first mapping may be applied. When bundling is performed, the UE may assume the same precoding for a corresponding bundling unit.

Figure 8:
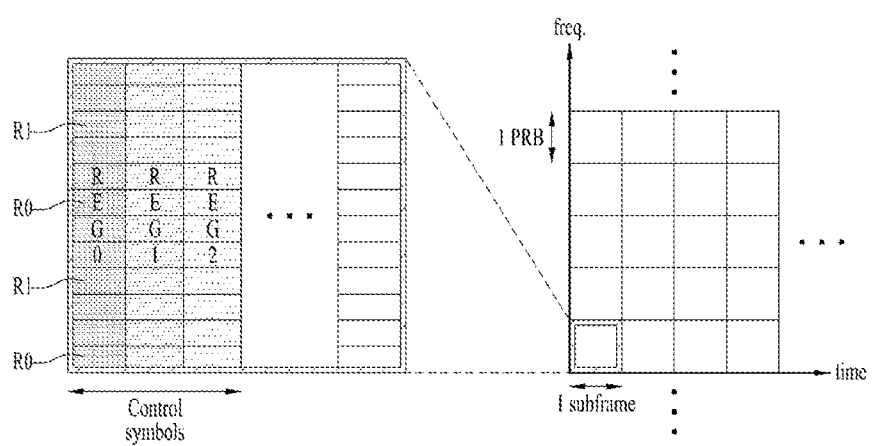
FIG. 8 illustrates an example of an NR-REG according to an embodiment of the present invention.

FIG. 8 illustrates an example of an NR-REG.

While it is illustrated in FIG. 8 that one REG is configured on one control symbol, the number of control symbols corresponding to one REG may be changed. For example, a REG or CCE may be defined as multiple symbols in the time domain.

In addition, while FIG. 8 illustrates a case where an RS is mapped only to the first control symbol, other RS configurations may be used. The number of REs (hereinafter referred to as available REs) available for transmission of control information in the NR-REG may be determined according to the RS configuration, and the number of available RE(s) may be configured differently in each REG. For example, in FIG. 8, the number of available REs of REG 0 is configured to be 8, and the number of available REs of REG 1, 2 is configured to be 12.

As a method for configuring an NR-CCE using NR-REG(s) (e.g., REG-to-CCE mapping), frequency first CCE mapping or time first CCE mapping may be taken into consideration. Each CCE mapping method may be interpreted as a method for selecting resources constituting a CCE or a method for selecting REGs constituting a CCE. In addition, CCE mapping may be configured differently according to, for example, an RS type (e.g., a shared RS, a UE-specific RS), a transmission scheme (e.g., 1-port beamforming, 2-port SFBC), a search space type (e.g., common search space, UE-specific search space), and/or an operating frequency/hybrid (analog) beamforming (e.g., under/above 6 GHz).

As an example, when it is assumed in FIG. 8 that REGs 0, 1 and 2 constitute one CCE, an RS may be mapped to only the first control symbol. The UE may assume that the channel coefficient (e.g., channel estimate) derived using the RS for the first control symbol is applied to all of REGs 0, 1, and 2. When the RS is mapped to only the first symbol among the symbols of the REGs constituting a CCE, RS overhead may be reduced.

Different control information/CCEs or control information/CCEs to be transmitted to different UEs may be positioned on one PRB, depending on the CCE mapping method. In this case, if the RS is mapped to only the first control symbol, the beamforming gain may not be obtained. According to an embodiment of the present invention, a method for determining an RS position on control symbols that may address the issue described above is proposed.

Figure 9:
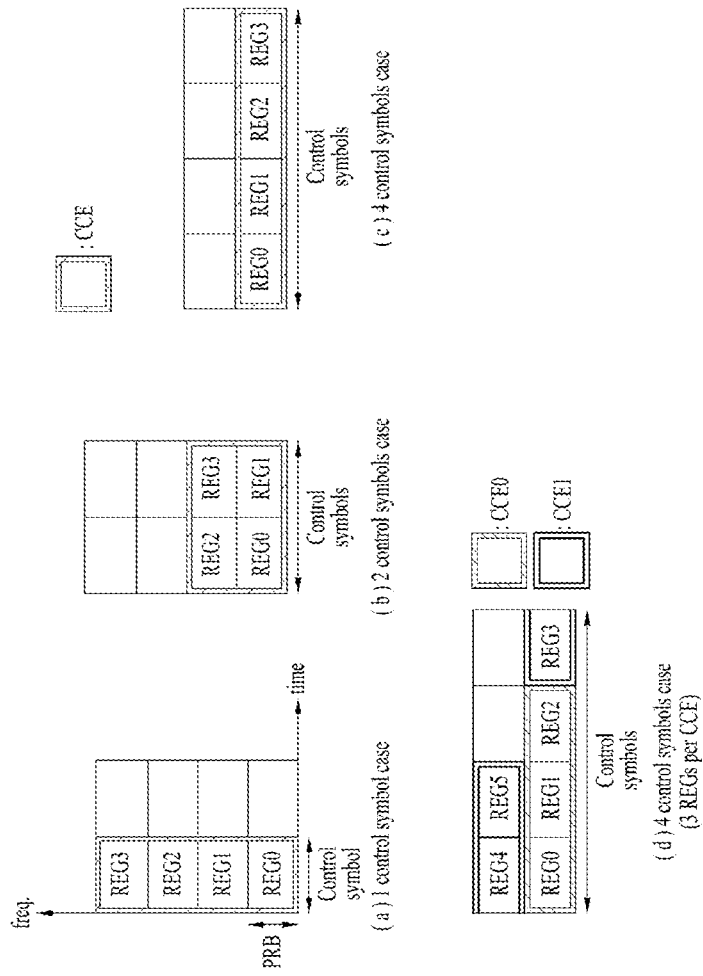
FIG. 9 illustrates an example* of CCE configuration based on the number of control symbols according to an embodiment of the present invention.

FIG. 9 illustrates an example of CCE configuration based on the number of control symbols.

Referring to FIG. 9, it is assumed that one CCE consists of four REGs. In order to describe an exceptional case, it is assumed in (d) that one CCE consists of three REGs. Time first mapping is assumed as a method for configuring a CCE. It is also assumed that the number of control symbols is 1, 2, or 4. The assumptions of FIG. 9 are made for simplicity. The embodiments of the present invention may be applied even to a case where the number of control symbols is increased or the number of REGs per CCE is increased.

A case of three control symbols (not shown) may be represented by a combination of a case of two control symbols (e.g., (b)) and a case of one control symbol (e.g., (a)). In this case, REG-to-CCE mapping may be performed in order of REG $0(f_0, t_0)$, REG $1(f_0, t_1)$, REG $2(f_1, t_0)$, REG $3(f_1, t_1)$, . . . , REG $k(f_0, t_2)$, REG $k+1(f_1, t_2)$, etc. Here, $f_i$ denotes a frequency domain index, and $t_j$ denotes a time domain index. That is, REG 0 refers to a REG corresponding to the lowest frequency resource (e.g., PRB) and the earliest time resource (e.g., symbol). REG-to-CCE mapping for three control symbols may be interpreted as being performed by performing REG-to-CCE mapping for two control symbols and REG-to-CCE mapping for one control symbol separately.

As another example, REG-to-CCE mapping for two control symbols and REG-to-CCE mapping for one control symbol may be separately to perform REG-to-CCE mapping for three control symbols, but CCE indexing may be performed considering three control symbols.

Such a REG-to-CCE mapping scheme may be applied even to four control symbols. For example, REG-to-CCE mapping for four control symbols may be understood as being performed by applying REG-to-CCE mapping of the 2-control symbol case and REG-to-CCE mapping of the ½-control symbol case, respectively.

Method for Determining an REG on which an RS is Transmitted

A REG determined according to the examples described below may be a REG on which the RS is actually transmitted or is assumed by the UE to be transmitted. Assuming, by the UE, that the RS is transmitted includes assuming the position of the RS when the UE performs blind decoding. If PDCCH is not actually transmitted on the corresponding REG, the RS may not be transmitted. In the following description, the control region may be a time/frequency resource that is predefined or configured by the network (through, for example, higher layer signaling, RRC signaling, PCFICH, MIB, SIB).

Example 1

According to an embodiment of the present invention, the RS may be transmitted on the first symbol of every PRB belonging to the control region, or the UE may assume a fixed RS transmission pattern.

Such an example may be applied to a case where a control channel is transmitted through the common search space (CSS), a case where the 2-port SFBC is used as a Tx scheme for the control channel, or a case where the control region is configured for distributed PDCCH (e.g., a shared RS is used). The distributed PDCCH may represent, for example, a case where the REGs constituting one CCE are present in different PRBs for frequency diversity gain.

According to this example, the UE may demodulate the REG(s) (or CCEs) present in the same PRB using a channel estimation result obtained through the RS for the first symbol.

In the case of a specific RS for control channel demodulation, if the size of a control resource set (CORESET) corresponds to one symbol, the UE may assume that the RS is transmitted on one symbol. If the size of the CORESET corresponds to two or three symbols, the UE may assume that the RS is transmitted over one or two symbols. An RS pattern (e.g., RS resource mapping pattern) for the control channel assumed by the UE may be the same as the primary RS pattern configured by the network or used for data.

In addition, in the case where a control channel and data are multiplexed (e.g., FDM) and transmitted in a resource region where both the control channel and the data can be transmitted, the UE may assume that the same pattern as the DM-RS pattern of the data is used for the RS of the control channel.

Alternatively, when the shared RS is used for the control channel, the pattern of the shared RS may be configured to be cell-common or group-common.

If one or more symbols belonging to a CORESET are reserved (e.g., the corresponding symbol is allocated to another channel/RS/information transmission), the UE may assume that the RS transmission is rate-matched at the corresponding position. In the case where a predetermined number of leading symbols of a slot are reserved or the control region is configured in the middle of the slot, the network may configure the start and end points of the time resources of the CORESET. In this case, a fixed DM-RS/RS pattern may be applied on the assumption that the start point of the CORESET is the start point of the corresponding slot. Such an operation is not limited to the control channel and may also be applied to the DM-RS of data.

As another example, in the case where there are multiple analog beams and each analog beam or beam group uses a different symbol, the OFDM symbol(s) used for the respective analog beams or beam groups may be regarded as different control regions, and Example 1 may be applied.

In FIG. 9(d), when CCE 0 and CCE 1 are used for transmission of control information of different UEs and precoding is configured differently for each CCE, the UE performs demodulation for REG 3 using the RS of REG 0, and accordingly reception performance of CCE 1 may be degraded.

Example 2

According to an embodiment of the present invention, an RS may be transmitted through the first REG of each CCE or a REG having the lowest index among the REGs constituting each CCE.

In the case of Example 2, RS overhead may be reduced compared to Example 1, but a constraint is required that the REGs constituting a CCE should be within a coherent time and a coherent frequency. In addition, if the CCE is extended in the frequency domain due to a small number of control symbols, channel estimation accuracy may be lowered, which may lead to performance degradation.

Example 3

According to an embodiment of the present invention, an RS may be transmitted through the first REG or a REG having the lowest index in each CCE in each PRB belonging to a control region.

According to Example 3, when an RS is transmitted on each PRB, and REGs belonging to different CCEs are present within one PRB, an RS may be transmitted through a REG having the lowest symbol index or REG index among the REGs constituting each CCE in the PRB.

For example, when REG(s) belonging to CCE 1 and REG(s) belonging to CCE 2 are included in one PRB, an RS may be transmitted through a REG corresponding to the lowest index symbol or the lowest index REG among the REG(s) belonging to CCE 1. Similarly, an RS may be transmitted through a REG corresponding to the lowest index symbol or the lowest index REG among the REG(s) belonging to CCE 2.

In the case of Example 3, channel estimation corresponding to precoding applied to the REGs of the corresponding CCE may be performed irrespective of the number of control symbols or the number of REGs constituting the CCE.

CCEs to which Example 3 is applied may include an aggregated CCE, and an RS position/pattern may be determined at a control channel candidate level. For example, if CCE 0 and CCE 1 in FIG. 9(*d*) are aggregated and a control channel candidate corresponds to aggregation level (AL) 2, an RS may be transmitted or assumed to be transmitted on REG 0 and REG 4, and blind detection may be performed on the control channel.

Figure 10:
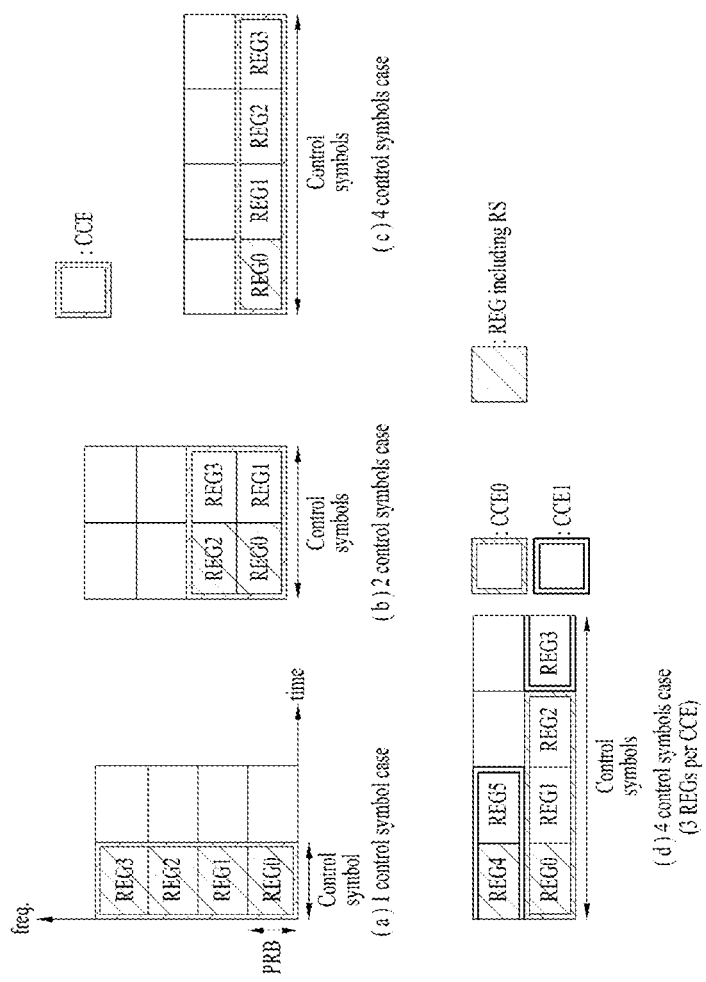
FIGS. 10 to 12 illustrate REGs on which an RS is transmitted or assumed to be transmitted according to embodiments of the present invention.
Figure 11:
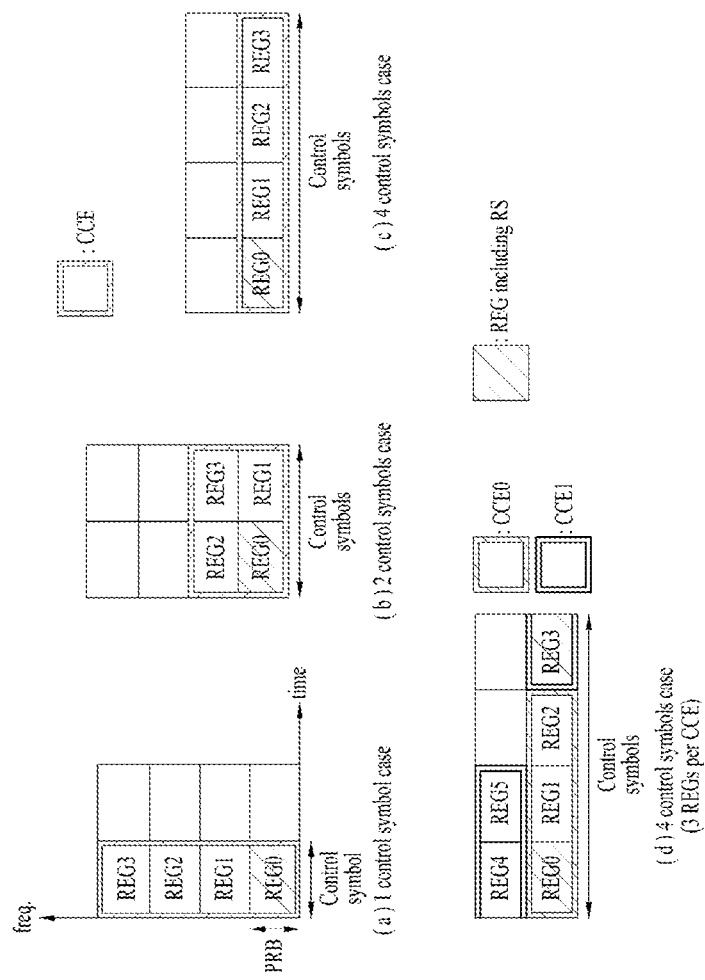
Figure 12:
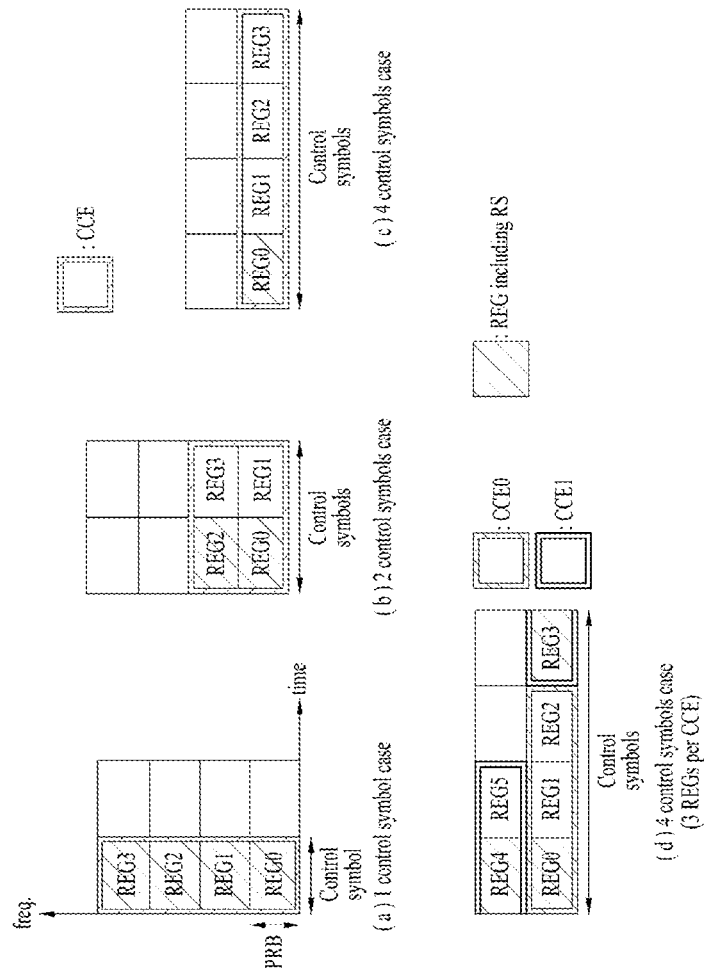

FIGS. 10 to 12 illustrate REGs on which an RS is transmitted or assumed to be transmitted according to embodiments of the present invention. FIG. 10 corresponds to Example 1, FIG. 11 corresponds to Example 2, and FIG. 12 corresponds to Example 3.

Example 4

According to an embodiment of the present invention, a UE may assume a fixed RS pattern as in Example 1, and may further assume additional RS transmission, if necessary.

For example, a fixed RS pattern may be applied to the first symbol of a CORESET. If there are other REGs for UEs to which different precoding is applied in one PRB, an additional RS may be transmitted.

For example, if a CSS for which a shared RS is configured occupies K (e.g., 1) symbols in a CORESET and a USS for which a UE-specific RS is configured is present on the remaining symbols (e.g., 2 symbols), an additional RS may be transmitted in the USS region. In this way, if both a CSS and a USS are configured in one CORESET, and the CSS region and USS region are divided as described above, an RS may be configured for each search space. When the CSS region and the USS region are divided, the CSS and the USS may be configured on different resources within the CORESET.

Example 3 described above may be used to transmit an additional RS. However, in determining the first REG for RS transmission, the UE may assume that an RS is sent in the first REG excluding the symbol to which the fixed RS is mapped/applied. When an additional RS is transmitted, the UE may assume that the additional RS is transmitted on a predetermined number of last symbols (e.g., 1 or 2 symbols) in the CORESET. If there can be other REGs for other UEs on one PRB, the UE may perform blind detection of a control channel, assuming that there is an additional RS regardless of mapping of a search space or actual execution of signal transmission for other UEs.

Example 5

According to an embodiment of the present invention, it may be assumed that the fixed RS pattern according to Example 1 is applied to a region corresponding to the CSS and an RS is mapped to each REG in a region corresponding to the USS. If the resources of the CSS and the resources of the USS overlap with each other, the RS may be transmitted according to the RS mapping in the CSS.

Control Channel Candidates

In an embodiment of the present invention, a resource on which the RS is transmitted may refer to an RE on which an RS is determined to be transmitted according to the RS mapping scheme.

The RS mapping scheme proposed above may also be applied to configuration of a control channel candidate. For example, the control channel candidate consists of one or more CCEs, and the PRB in the RS mapping scheme discussed above may be replaced with a control channel candidate. The control channel candidate may be referred to simply as a candidate.

As a specific example, Example 3 may be applied for the control channel candidate as follows.

The UE may assume that an RS is only transmitted on a specific REG on each PRB belonging to each candidate. The specific REG may be, but is not limited to, a REG having a specific time-domain value.

For example, the UE may assume that the RS is transmitted on a temporally-leading REG in each PRB in which REGs belonging to the candidate is positioned. In this case, the UE may apply the channel estimation result, obtained through the RS transmitted on each PRB, to all REGs transmitted in the corresponding PRB of the candidate.

Figure 13:
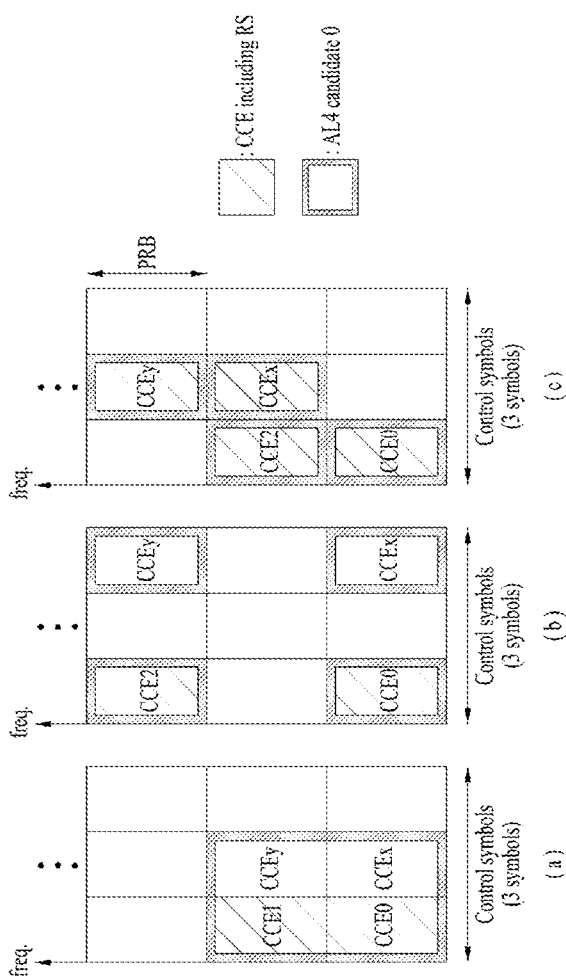
FIG. 13 shows control channel candidates according to an embodiment of the present invention.

FIG. 13 shows control channel candidates according to an embodiment of the present invention. Although it is assumed in FIG. 13 that each CCE is configured by frequency first mapping, time first mapping may also be applied.

In frequency first mapping, each CCE may be present within one symbol in the time domain. If an RS is transmitted on the CCE, the UE may assume that the RS is transmitted on all REGs constituting the CCE.

If one CCE is present on multiple OFDM symbols in frequency first mapping or time first mapping is applied, the RS may be transmitted through the temporally-leading REG in each PRB including REGs belonging to each candidate. In this case, multiple REGs included in one CCE may be present in one PRB, and the RS may not be transmitted on some REGs of the CCE.

FIGS. 13(*a*), 13(*b*) and 13(*c*) illustrate CCE combinations that configure AL4 candidates according to different CCE-to-candidate mapping schemes. The RS may be transmitted on CCEs marked by shade or on REGs selected within the corresponding CCE.

RS mapping within a CCE may conform to the RS mapping scheme within a REG discussed above.

When Example 1 is applied, an RS pattern that is mapped to each PRB is fixed.

In the case where Example 3 is applied and multiple CCEs are mapped to one PRB, each CCE may include an RS regardless of whether the multiple CCEs are for one UE or for different UEs. For example, the RS may be transmitted through the first REG among the REGs belonging to each CCE.

In the case where Example 4 is applied and multiple CCEs are mapped to one PRB, an additional RS may not be transmitted if the multiple CCEs are for one UE, and may be transmitted if the multiple CCEs are for different UEs. On the other hand, if CCEs for different UEs can be mapped to one PRB, the corresponding UE may assume that an additional RS is transmitted regardless of whether or not the CCEs are actually allocated to one UE.

CCE-to-Candidate Mapping for High Aggregation Level

As described above, the frequency first mapping or time first mapping scheme may be used for REG-to-CCE mapping for each CCE.

Hereinafter, a CCE-to-candidate mapping scheme for configuring candidates at a high aggregation level will be discussed.

As in the case of the REG-to-CCE mapping scheme, the frequency first mapping/time first mapping scheme may be considered for the CCE-to-candidate mapping scheme. The frequency first mapping scheme may be more advantageous in terms of channel estimation performance. In the case of time first mapping, a coding gain may be obtained according to reduction of RS overhead.

The network may preconfigure a CCE-to-candidate mapping scheme for the network to use, or indicate a mapping scheme by RRC signaling or the like, in consideration of the channel condition of each UE (e.g., based on the feedback of the UE).

As another example of flexible application of mapping schemes, different CCE-to-candidate mapping schemes may be configured for respective resource regions.

Figure 14:
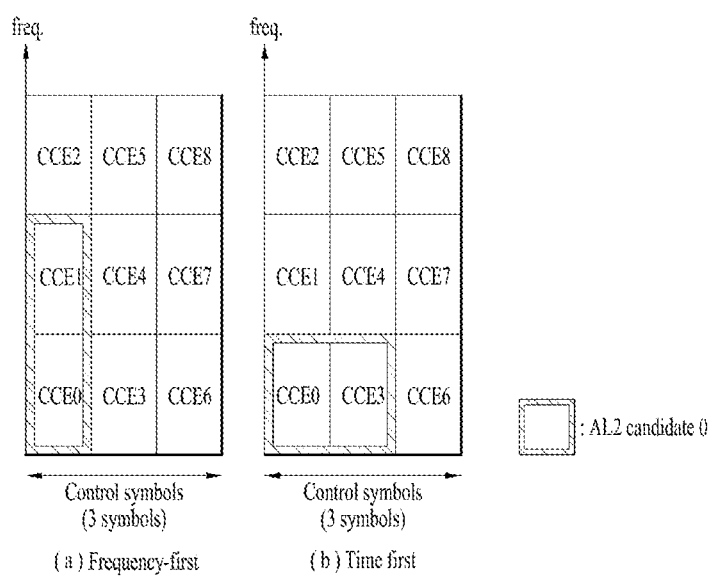
FIG. 14 illustrates an example of a CCE-to-candidate mapping scheme according to an embodiment of the present invention.

FIG. 14 illustrates an example of a CCE-to-candidate mapping scheme. In FIG. 14, resources on which the RS is transmitted may be determined according to the above-described scheme.

In addition, in time first mapping, indexing of consecutive CCEs may be performed in the time domain first. In this case, CCE-to-candidate mapping may be performed in order of CCE $0(f_0, t_0)$, CCE $1(f_0, t_1)$, CCE $2(f_0, t_2)$, CCE $3(f_1, t_0)$, CCE $4(f_1, t_1)$, CCE $5(f_1, t_2)$, CCE $6(f_2, t_0)$, etc.

The 3-control symbol case may be represented by a combination of the 2-control symbol case and the 1-control symbol case. In this case, mapping may be performed in order of CCE $0(f_0, t_0)$, CCE $1(f_0, t_1)$, CCE $2(f_1, t_0)$, CCE $3(f_1, t_1)$, ..., CCE $k(f_0, t_2)$, CCE $k+1(f_1, t_2)$, etc. A similar scheme may be applied to the 4-control symbol case. For example, the 4-control symbol case may be represented by a combination of the 2-control symbol case and the 1 or 2-control symbol case.

Localized/distributed mapping schemes may also be considered for the CCE-to-candidate mapping scheme.

The localized CCE-to-candidate mapping scheme refers to a method by which a CCE used at the previous AL and a CCE around the CCE are aggregated when the AL is raised. In this case, the frequency-first or time-first CCE-to-candidate mapping scheme proposed above may be used.

The distributed CCE-to-candidate mapping scheme refers to a mapping scheme for obtaining a diversity gain by configuring a spacing between a CCE used at the previous AL and a new CCE in a frequency/time domain.

Figure 15:
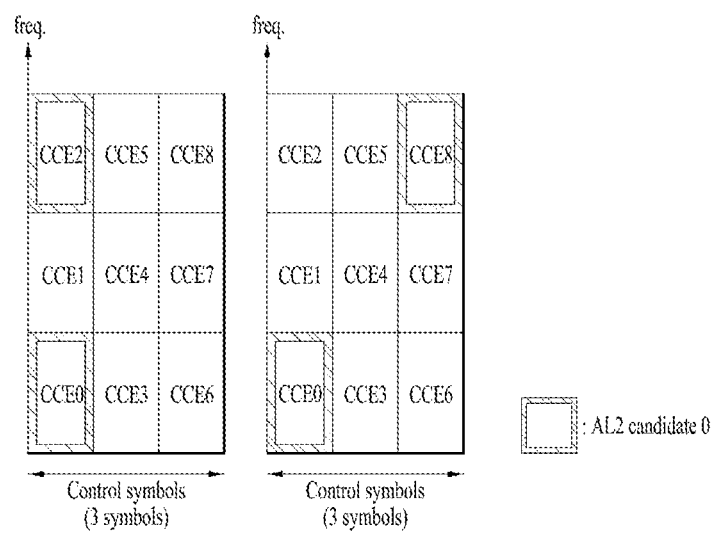
FIG. 15 illustrates an example of a distributed CCE-to-candidate mapping scheme according to an embodiment of the present invention.

FIG. 15 illustrates an example of the distributed CCE-to-candidate mapping scheme.

In FIG. 15, the left diagram illustrates distribution of CCEs constituting a candidate in the frequency domain, and the right diagram illustrates distribution of the CCEs in the time/frequency domain.

The network may preconfigure a CCE-to-candidate mapping scheme (e.g., localized/distributed mapping scheme) that the network uses or indicate, through RRC signaling, a mapping scheme considering the channel condition (based on, for example, feedback of each UE). As another method to flexibly apply each mapping scheme, the localized/distributed CCE-to-candidate mapping scheme may be configured differently for each resource region.

Localized mapping and distributed mapping may be performed by representing CCE indexing in a localized or distributed manner.

Reuse of Channel Estimation Result

According to the channel estimation scheme in 3GPP NR, for one UE, the channel estimate obtained for one RE should be reusable across multiple blind decodings involving that RE in at least the same control resource set and type of the search space (e.g., common or UE-specific search space).

For example, the UE may reuse the channel estimation result obtained for a specific RE in different candidates while performing blind decoding on the control channel.

Ambiguity may occur when both determination of the position of a CCE or REG on which the RS is transmitted at the candidate level and the channel estimation scheme in 3GPP NR are considered among the proposed details of the present invention.

Figure 16:
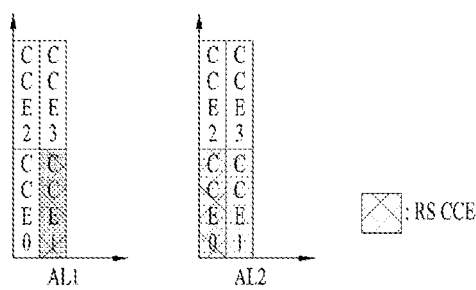
FIG. 16 illustrates an example of ambiguity that may occur due to a channel estimation scheme in 3GPP NR.

FIG. 16 illustrates an example of ambiguity that may occur due to the above-mentioned channel estimation scheme in 3GPP NR.

Referring to FIG. 16, according to a scheme of determining the position of a CCE or REG on which the RS is transmitted at the candidate level, it may be assumed that the RS is transmitted on a corresponding CCE (i.e., CCE 1) in the AL1 candidate and is transmitted on CCE 0 in the AL2 candidate.

However, considering the channel estimation scheme in 3GPP NR, the channel estimation result obtained in the operation of blind decoding of the AL1 candidate should be reusable when channel estimation is performed for CCE 1 of the AL2 candidate. However, when the candidate in which the control channel is actually transmitted is an AL2 candidate, the channel estimation scheme of 3GPP NR may not be applied because the RS has not been mapped to CCE 1, and the result of channel estimation performed on CCE 1 having no RS is meaningless.

In this regard, exemplary methods for addressing such ambiguity will be further described below.

Example A

According to an embodiment of the present invention, RS transmission resources may be determined at the SS level. For example, the UE may determine RS transmission resources on an SS-by-SS basis. RS transmission resource 1 may be determined for SS 1, and RS transmission resource 2 may be determined for SS 2. Blind detection may be performed on candidates corresponding to various ALs included in SS 1 considering RS transmission resource 1, and blind detection may be performed on candidates corresponding to various ALs included in SS 2 considering RS transmission resource 2. Specific methods for such operation will be discussed.

First, the UE may assume resources on which the RS is transmitted, considering all candidates of an SS on which blind decoding is performed. For example, the UE may determine resources on which the RS is transmitted for each candidate according to the previously proposed examples, and determine resources (e.g., RS map) on which the RS is transmitted at the SS level by arranging the determined RS resources in an overlapping manner (e.g., union). Then, the UE may determine a resource on which an RS is assumed to be transmitted for the corresponding candidate, using the RS map.

Figure 17:
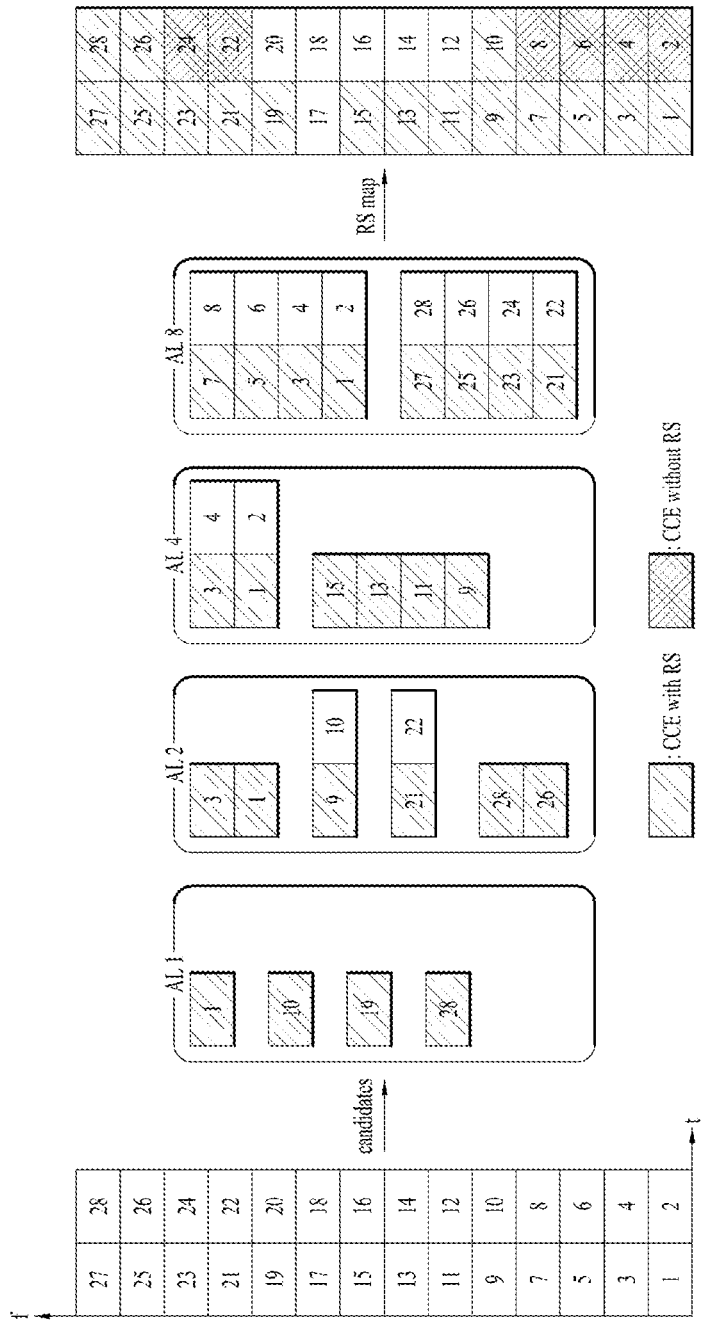
FIG. 17 illustrates an example of determination of RS transmission resources at a search space level according to an embodiment of the present invention.

FIG. 17 illustrates an example of determining RS transmission resources at the SS level according to an embodiment of the present invention.

Referring to FIG. 17, a total of 28 CCEs are shown. For simplicity, it is assumed that there are four candidates (e.g., CCE 1, CCE 10, CCE 19, and CCE 28) corresponding to AL1, four candidates (e.g., CCE 1+3, CCE 9+10, CCE 21+22 and CCE 26+28) corresponding to AL2, two candidates (e.g., CCE 1+2+3+4, CCE 9+11+13+15) corresponding to AL4, and eight candidates (e.g., CCEs 1 to 8, CCEs 21 to 28) corresponding to AL4. However, the present invention is not limited thereto.

First, the UE determines resources on which the RS is transmitted for each candidate in the SS on which blind decoding is to be performed. For the method for determining RS resources for each candidate, one of the above-described examples may be used. However, the present invention is not limited thereto. For example, since all the candidates corresponding to AL1 are single CCEs, the RS is assumed to be transmitted on all CCEs. At ALs2/4/8, the RS is assumed to be transmitted on CCE(s) that precede the other CCEs in the time domain among the CCEs included in the corresponding candidate.

The UE may then configure an RS map considering the RS transmission resources of all the candidates (e.g., all candidates of ALs1 to 8). For example, the RS map may be configured through overlapping or union of RS transmission resources of all the candidates.

The RS map configured by the UE is used to assume the RS resource positions when the UE performs blind decoding, and thus the RS is not necessarily transmitted on all RS resources in the RS map. For example, resources on which the RS is actually transmitted may be determined only for the candidates in which the control channel (e.g., NR-PDCCH) is actually transmitted. The network may determine the RS transmission resources in a candidate in which the PDCCH is actually transmitted, based on the RS map.

Figure 18:
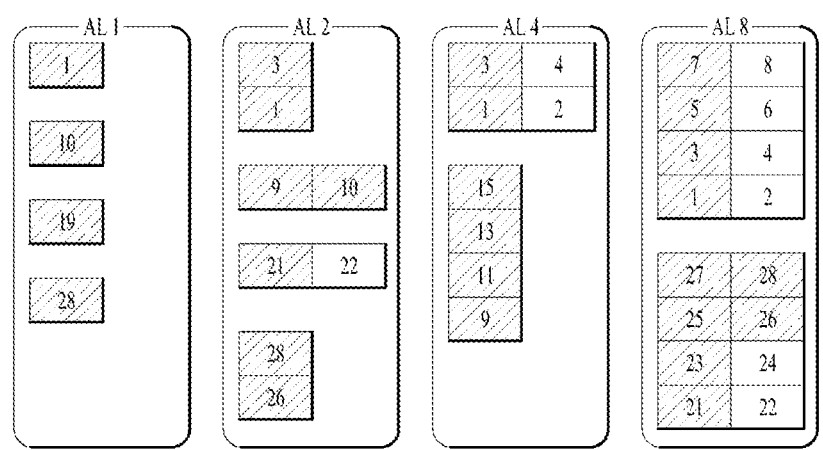
FIG. 18 illustrates RS resources determined using an RS MAP according to an embodiment of the present invention.

FIG. 18 illustrates RS resources determined using an RS map according to an embodiment of the present invention. FIG. 18 illustrates a case where the UE assumes RS resource positions using the RS map of FIG. 17. For example, when the UE blind-decodes the candidates corresponding to the respective ALs, the UE may assume RS transmission resources as shown in FIG. 18.

In this case, the UE may operate for channel estimation for a specific candidate as follows.

The UE may determine whether to reuse, in current blind decoding, a channel estimation result for a candidate that has been blind-decoded. Even if the UE does not reuse the channel estimation result obtained through the RS, the UE performs blind detection, assuming rate matching of the control information based on the RS.

For example, CCE 1 in FIG. 18 is included in all ALs. According to the 3GPP NR channel estimation scheme, in blind detection of an AL2 candidate CCE 1+3, the UE only needs to reuse a channel estimate obtained in the blind detection operation on the AL1 candidate CCE 1 as the channel estimate for CCE 1 and to perform channel estimation for CCE 3.

However, in some cases, channel estimation using both the RS of CCE 1 and the RS of CCE 3 may exhibit better performance. Therefore, the UE may determine whether to reuse the channel estimation result for CCE 1 in AL1 blind detection or whether to perform channel estimation for CCE 1+3 through PRB bundling at AL2.

For example, the UE may determine whether to reuse a channel estimate according to the PRB bundling size and the like. To this end, the network may inform the UE of whether to perform inter-CCE PBR bundling on the control resources (e.g., CORESET, search space, subframe set) or the PRB bundling size through broadcast or UE (group)-dedicated signaling.

For example, if the network signals that PRB bundling is allowed within the same candidate (or the same precoding can be assumed within the same candidate), the UE may perform channel estimation through PRB bundling for each candidate without reusing the channel estimation result.

As another example, the UE may reuse the channel estimation result for CCEs 21, 26, and 28 obtained through AL½ candidate blind detection in blind-detecting AL8 candidate CCEs 21 to 28 of FIG. 18. The UE may perform channel estimation through bundling for CCEs 21, 23, 25, and 27 without reusing the channel estimation result. In this case, for CCEs 26 and 28, the UE does not reuse the channel estimation result obtained through the RS, but should assume that the corresponding RS is transmitted on CCEs 26 and 28. Accordingly, the UE may perform blind decoding on the assumption that the control information is rate-matched by the RS on CCEs 26 and 28.

Figure 19:
FIG. 19 illustrates a case where CCEs on which RSs are transmitted and CCEs on which RSs are not transmitted coexist on the same frequency resource according to an embodiment of the present invention.

In some implementations, as shown in FIG. 19, CCEs on which the RS is transmitted and CCEs on which the RS is not transmitted may coexist on the same frequency resource. For simplicity, it is assumed that CCEs 9, 10, and 11 are included in the same candidate and are positioned on the same frequency resource. It is also assumed that CCE 10 is a CCE for which a channel estimation result has been derived in the operation of blind detection of another candidate.

For CCE 11, the UE may reuse a channel estimation result on a CCE close to CCE 11 in the time domain. For example, the UE may apply the channel estimation result obtained through an RS to a CCE after the point of time at which the RS is transmitted.

As another method, the channel estimation result through bundling may be applied to a CCE on the RS is not transmitted. This may be intended to applying a more accurate channel estimation result.

Example B

According to an embodiment of the present invention, the channel estimation result may be reusable only when the RS transmission CCEs match each other.

For example, the channel estimation result may be reused only when the CCEs of different candidates on which the RS is transmitted match each other. According to the above-described examples, a CCE on which the RS is transmitted may be determined in each candidate. In this case, only when the RS is transmitted on the same CCE in different candidates, the channel estimation result of the corresponding CCE may be restricted to be reusable.

As an example, in the case of AL8 candidate CCEs 21 to 28 of FIG. 17, the channel estimation result for CCEs 26 and 28 is obtained through AL2 candidate CCE 26+28, but the RS is not present on CCEs 26 and 28, which are included in AL8 candidate CCEs 21 to 28. Therefore, the UE cannot reuse the channel estimation result obtained through AL2 candidate CCE 26+28 for AL8 candidate CCEs 21 to 28. In addition, in performing blind decoding of AL8 candidate CCEs 21 to 28, the UE may perform blind detection on the assumption that there is no RS on CCEs 26 and 28.

On the other hand, the UE may reuse the channel estimation result for AL2 candidate CCE 1+3 for AL8 candidate CCEs 1 to 8. However, whether to reuse the channel estimate may be determined according to conditions such as PRB bundling as in Example A.

Example C

According to an embodiment of the present invention, the channel estimation result may be reused in consideration of the RS type. For example, the channel estimation result may be reused only in the case of shared RS.

As another example, the 3GPP NR channel estimation scheme may be limited so as to be applied only to control resources on which the shared/common RS is used. Since the shared/common RS can be commonly applied on the corresponding frequency resource, the 3GPP NR channel estimation scheme may be applied therefor.

When the SS enables application of the 3GPP NR channel estimation scheme, the RS mapping scheme may be restricted to use only Example 1 or 4. For example, by selecting an RS mapping scheme, the network may avoid the aforementioned issues related to application of the 3GPP NR channel estimation scheme.

The RS mapping schemes discussed above may be determined in association with a specific transmission scheme or may be configured differently for each control resource by the network. For example, it may be predefined that Example 1 shall be used when a transmission diversity scheme (e.g., SFBC, precoder cycling, etc.) is used, and Example 3 shall be used when a UE-dedicated beamforming scheme is used. As another example, it may be predefined that Example 1 shall be used when resource mapping is performed in a distributed mode (e.g., a mode in which control information resources are not contiguous, but are spread wide in the time/frequency domain), and Example 3 shall be used when resource mapping is performed in the localized mode. Alternatively, a plurality of CORESETs may be configured by the network, and the RS mapping scheme may be configured differently for each CORESET. Here, the RS mapping scheme may cover all the examples proposed above.

Unlike the above-described embodiments, in the case where NR PDCCH is transmitted, the RS may be transmitted on all REGs.

Figure 20:
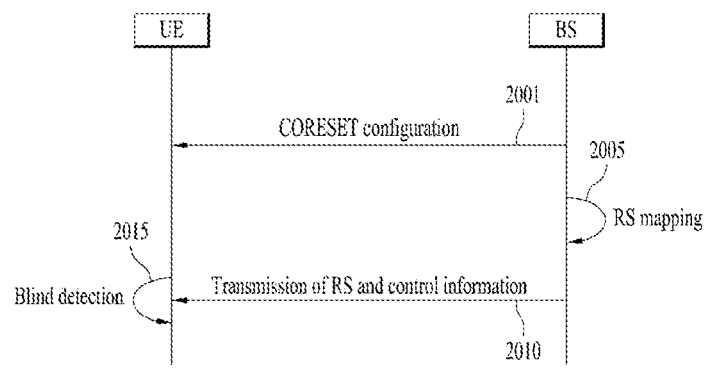
FIG. 20 illustrates a method for transmitting and receiving downlink control information according to an embodiment of the present invention.

FIG. 20 illustrates a method for transmitting and receiving downlink control information according to an embodiment of the present invention. Description of features already described above may be omitted.

Referring to FIG. 20, a BS configures a CORESET for a UE (2001). At least one SS may be present in the CORESET. The SS may include multiple control channel candidates each corresponding to one or more control channel elements (CCEs) according to an aggregation level. Each of the one or more CCEs may include a plurality of resource element groups (REGs).

The BS maps a reference signal for a control channel in the SS configured in the CORESET (2005). The BS may map a reference signal for a predetermined control channel candidate carrying downlink control information among a plurality of control channel candidates to a first REG that is at a leading position in the time domain among REGs included in a predetermined control channel candidate.

The BS transmits, to the UE, the reference signal and the downlink control information that is on the control channel (2010).

The UE performs blind detection on the downlink control information (2015). Specifically, the UE receives the reference signal for the control channel in the SS configured in the CORESET. The UE receives the downlink control information on the control channel based on the reference signal. The UE may perform blind detection on each of the plurality of control channel candidates, assuming that the reference signal for a predetermined control channel candidate currently subjected to blind detection is mapped to a first REG that is at the leading position in the time domain among the REGs included in the predetermined control channel candidate.

If a second REG among the REGs included in the predetermined control channel candidate belongs to the same physical resource block (PRB) as the first REG in the frequency domain and is positioned after the first REG in the time domain, the UE may perform blind detection on a predetermined control channel candidate by applying the channel estimation result obtained through the reference signal to the second REG.

When the first REG belongs to a first CCE and one or more REGs of a second CCE different from the first CCE are positioned on the same physical resource block (PRB) as the first REG, the UE may assume that the RS is mapped to a second REG, which is at a leading position between the one or more REGs of the second CCE in the time domain.

Both a CSS and a USS may be configured in a CORESET, and RS transmission may be configured in the USS separately from the CSS. In one example, within the CORESET, the CSS and the USS may be distinguished from each other by different resources. As another example, RS transmission for the CSS may be performed on a resource on which the CSS and the USS overlap with each other in the CORESET.

The UE may reuse at least a part of the channel estimation result obtained from the RS for a predetermined control channel candidate for blind detection of another control channel candidate that is to be performed after the current time.

The UE may obtain an RS map on an SS-by-SS-basis by arranging all positions of the RS resources determined for each of a plurality of control channel candidates in an overlapping manner, and perform rate matching of a predetermined control channel candidate, assuming RS transmission on a specific RS resource identified through the RS map regardless of whether the specific RS resource corresponds to the aggregation level of current blind detection.

At least a part of the channel estimation result to be reused may be obtained from a CCE that is included in the predetermined control channel candidate and another control channel candidate in common.

Figure 21:
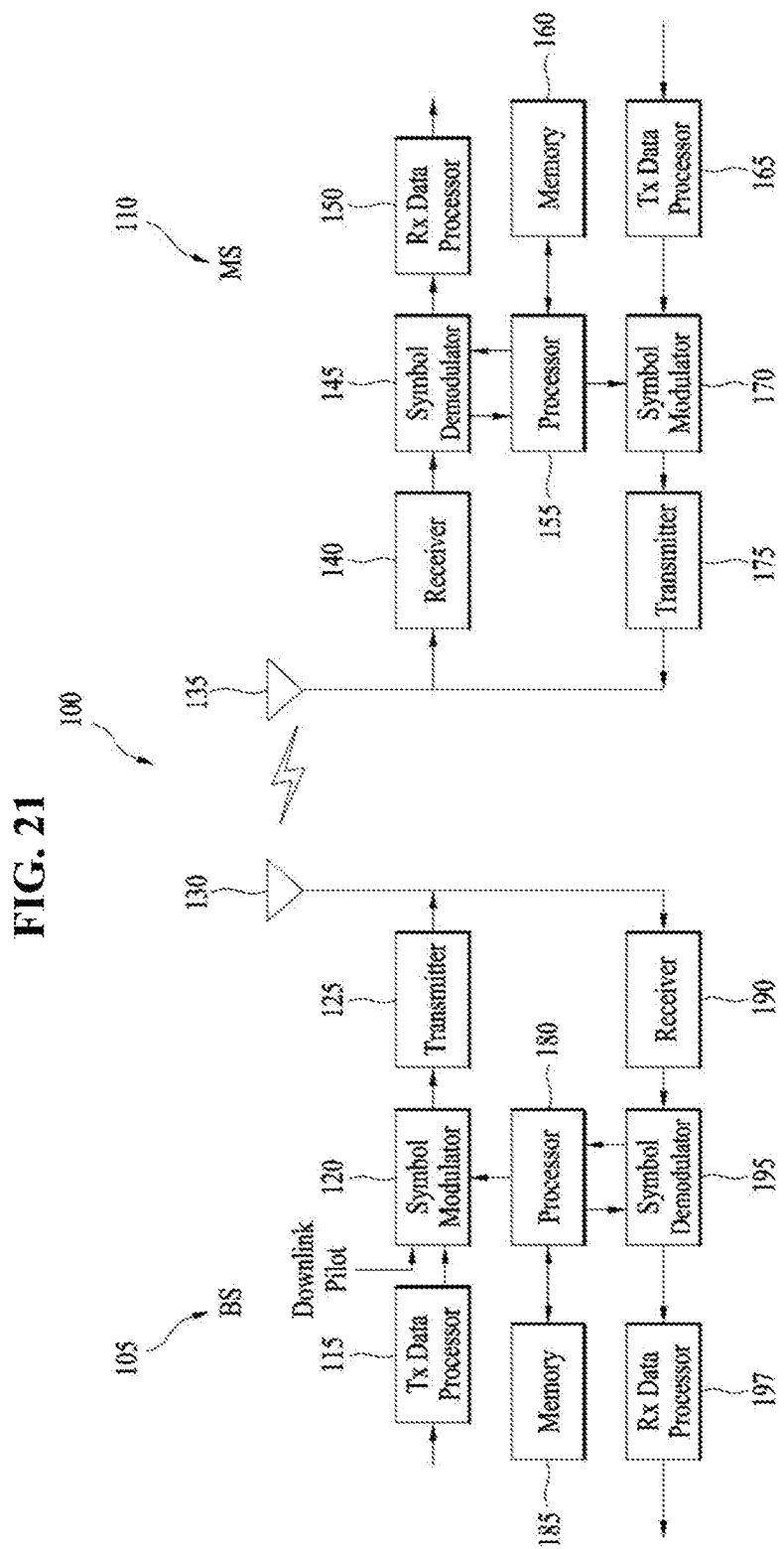
FIG. 21 illustrates a user equipment (UE) and a base station (BS) according to an embodiment of the present invention.

FIG. 21 is a block diagram illustrating the configuration of a BS 105 and a UE 110 in a wireless communication system 100 according to an embodiment of the present invention.

While one BS 105 and one UE 110 are shown in the drawing to schematically represent the wireless communication system 100, the wireless communication system 100 may include at least one BS and/or at least one UE.

The BS 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, the UE 110 may include a transmitted (Tx) data processor 165, a symbol modulator 170, a transmitter 175, a transceiving antenna 135, a processor 155, a memory 160, a receiver 140, a symbol demodulator 155 and a received data processor 150. Although the BS 105/UE 110 are illustrated as including one antenna 130, 135, each of the BS 105 and the UE 110 includes a plurality of antennas. Therefore, each of the BS 105 and the UE 110 of the present invention supports a multiple input multiple output (MIMO) system. And, the BS 105 according to the present invention may support both the single user-MIMO (SU-MIMO) system and the multi user-MIMO (MU-MIMO) system.

In downlink, the transmission data processor 115 receives traffic data, codes the received traffic data by formatting the received traffic data, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In this operation, each of the transmitted symbols may include the data symbol, the pilot symbol or a signal value of zero. In each symbol duration, pilot symbols may be contiguously transmitted. In this operation, the pilot symbols may include symbols of frequency division multiplexing (FDM), orthogonal frequency division multiplexing (OFDM), or code division multiplexing (CDM).

The transmitter 125 receives the stream of the symbols, converts the received stream to at least one or more analog signals, additionally adjusts the analog signals (e.g., amplification, filtering, frequency upconverting), and then generates a downlink signal suitable for a transmission on a radio channel. Subsequently, the downlink signal is transmitted to the UE via the antenna 130.

In the configuration of the UE 110, the receiving antenna 135 receives the downlink signal from the BS and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, performs data demodulation on the received data symbols, obtains data symbol estimated values (i.e., estimated values of the transmitted data symbols), and then provides the data symbols estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmission data processor 115 in the BS 105, respectively.

In the UE 110 on uplink, the transmission data processor 165 processes the traffic data and then provides data symbols. The symbol modulator 170 receives the data symbols, multiplexes the received data symbols, performs modulation on the multiplexed symbols, and then provides a stream of the symbols to the transmitter 175. The transmitter 175 receives the stream of the symbols, processes the received stream, and generates an uplink signal. This uplink signal is then transmitted to the BS 105 via the antenna 135.

In the BS 105, the uplink signal is received from the UE 110 via the antenna 130. The receiver 190 processes the received uplink signal and then obtains samples. Subsequently, the symbol demodulator 195 processes the samples and then provides pilot symbols received in uplink and a data symbol estimated value. The received data processor 197 processes the data symbol estimated value and then reconstructs the traffic data transmitted from the UE 110.

The processor 155/180 of the UE 110/BS 105 directs operations (e.g., control, adjustment, management, etc.) of the UE 110/BS 105. The processor 155/180 may be connected to the memory unit 160, 185 configured to store program codes and data. The memory 160, 185 is connected to the processor 155, 180 to store operating systems, applications and general files.

The processor 155, 180 may be called one of a controller, a microcontroller, a microprocessor, a microcomputer and the like. And, the processor 155, 180 may be implemented using hardware, firmware, software and/or any combinations thereof. In the implementation by hardware, the processor 155, 180 may be provided with such a device configured to implement the present invention as application specific integrated circuits (ASICs), digital signal processors (DSPs), digital signal processing devices (DSPDs), programmable logic devices (PLDs), field programmable gate arrays (FPGAs), and the like.

In case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155, 180 or stored in the memory 160, 185 so as to be driven by the processor 155, 180.

Layers of a radio protocol between a UE/BS and a wireless communication system (network) may be classified into 1st layer L1, 2nd layer L2 and 3rd layer L3 based on 3 lower layers of open system interconnection (OSI) model well known to communication systems. A physical layer belongs to the 1st layer and provides an information transfer service via a physical channel. Radio resource control (RRC) layer belongs to the 3rd layer and provides control radio resourced between UE and network. A UE and a BS may exchange RRC messages with each other through a wireless communication network and RRC layers.

The above-mentioned embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

As described above, the present invention is applicable to various wireless communication systems.

The invention claimed is:

1. A method for receiving downlink control information by a user equipment (UE) in a wireless communication system, the method comprising:
receiving a reference signal for a control channel in a search space configured in a control resource set (CORESET); and
receiving the downlink control information on the control channel based on the reference signal,
wherein the search space comprises a plurality of control channel candidates each corresponding to one or more control channel elements (CCEs) based on an aggregation level,
wherein each of the one or more CCEs comprises a plurality of resource element groups (REGs), and
wherein the UE performs blind detection on each of the plurality of control channel candidates, assuming that a reference signal for a predetermined control channel candidate currently subjected to blind detection is mapped to a first REG arranged at a leading position in a time domain among REGs included in the predetermined control channel candidate.

2. The method of claim 1, wherein, based on a second REG among the REGs included in the predetermined control channel candidate (i) belonging to the same physical resource block (PRB) as the first REG in a frequency domain and (ii) being positioned after the first REG in the time domain, the UE performs blind detection on the predetermined control channel candidate by applying a channel estimation result obtained through a reference signal on the first REG to the second REG.

3. The method of claim 1, wherein, based on (i) the first REG belonging to a first CCE and (ii) one or more REGs of a second CCE different from the first CCE being positioned on the same physical resource block (PRB) as the first REG, the UE assumes that the reference signal is also mapped to a second REG arranged at a leading position between the one or more REGs of the second CCE in the time domain.

4. The method of claim 1, wherein both a common search space (CSS) and a UE-specific search space (USS) are configured in the CORESET,
wherein reference signal transmission is configured for the USS separately from the CSS.

5. The method of claim 4, wherein the CSS and the USS are distinguished from each other through different resources in the CORESET.

6. The method of claim 4, wherein reference signal transmission for the CSS is performed on a resource in the CORESET, the CSS and the USS overlapping with each other on the resource.

7. The method of claim 1, wherein the UE reuses at least a part of a channel estimation result obtained from the reference signal for the predetermined control channel candidate for blind detection of another control channel candidate to be performed after a current time.

8. The method of claim 7, wherein the UE obtains a reference signal map for each search space by arranging all positions of reference signal resources determined for each of the control channel candidates in an overlapping manner,
wherein the UE performs rate matching of the predetermined control channel candidate on an assumption of reference signal transmission on a specific reference signal resource identified through the reference signal map, regardless of whether or not the specific reference signal resource corresponds to an aggregate level of current blind detection.

9. The method of claim 7, wherein the at least reused part of the channel estimation result is obtained from a CCE included in the predetermined control channel candidate and the other control channel candidate in common.

10. A method for transmitting downlink control information by a base station in a wireless communication system, the method comprising:
mapping a reference signal for a control channel in search space configured in a control resource set (CORESET); and
transmitting, to a user equipment (UE), the reference signal and downlink control information present on the control channel,
wherein the search space comprises a plurality of control channel candidates each corresponding to one or more control channel elements (CCEs) based on an aggregation level,
wherein each of the one or more CCEs comprises a plurality of resource element groups (REGs), and
wherein the base station maps a reference signal for a predetermined control channel candidate carrying the downlink control information among the plurality of control channel candidates to a first REG arranged at a leading position in a time domain among REGs included in a predetermined control channel candidate.

11. The method of claim 10, wherein, based on (i) the first REG belonging to a first CCE and (ii) one or more REGs of a second CCE different from the first CCE being positioned on the same physical resource block (PRB) as the first REG, the base station also maps the reference signal to a second REG arranged at a leading position between the one or more REGs of the second CCE in the time domain.

12. The method of claim 10, wherein both a common search space (CSS) and a UE-specific search space (USS) are configured in the CORESET,
wherein reference signal transmission is configured for the USS separately from the CSS.

13. The method of claim 12, wherein the CSS and the USS are distinguished from each other through different resources in the CORESET.

14. The method of claim 12, wherein reference signal transmission for the CSS is performed on a resource in the CORESET, the CSS and the USS overlapping with each other on the resource.

15. A user equipment (UE) configured to receive downlink control information, the UE comprising:
a processor; and
a receiver operative under control of the processor to:
receive a reference signal for a control channel in a search space configured in a control resource set (CORESET); and
receive downlink control information on the control channel based on the reference signal,
wherein the search space comprises a plurality of control channel candidates each corresponding to one or more control channel elements (CCEs) based on an aggregation level,
wherein each of the one or more CCEs comprises a plurality of resource element groups (REGs), and wherein the processor performs blind detection on each of the plurality of control channel candidates, assuming that a reference signal for a predetermined control channel candidate currently subjected to blind detection is mapped to a first REG arranged at a leading position in a time domain among REGs included in the predetermined control channel candidate.

\* \* \* \* \*